(12) United States Patent
Kim et al.

(10) Patent No.: US 10,222,656 B2
(45) Date of Patent: Mar. 5, 2019

(54) LIQUID CRYSTAL DISPLAY DEVICE AND MANUFACTURING METHOD THEREOF

(71) Applicant: Samsung Display Co. Ltd., Yongin-si (KR)

(72) Inventors: Young Gu Kim, Yongin-si (KR); Kyung Ho Park, Suwon-si (KR); Su Ji Park, Seoul (KR); Baek Kyun Jeon, Yongin-si (KR); Min Sik Jung, Yongin-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 28 days.

(21) Appl. No.: 15/230,084

(22) Filed: Aug. 5, 2016

(65) Prior Publication Data

US 2017/0205668 A1    Jul. 20, 2017

(30) Foreign Application Priority Data

Jan. 15, 2016 (KR) .................... 10-2016-0005168

(51) Int. Cl.
*G02F 1/1337* (2006.01)
*G02F 1/1343* (2006.01)
(Continued)

(52) U.S. Cl.
CPC .... *G02F 1/133788* (2013.01); *G02F 1/13439* (2013.01); *G02F 1/133345* (2013.01); *G02F 1/133512* (2013.01); *G02F 1/134336* (2013.01); *G02F 1/136286* (2013.01); *G09G 3/3614* (2013.01); *G09G 3/3648* (2013.01);
(Continued)

(58) Field of Classification Search
CPC ... G02F 2001/134372; G02F 1/133707; G02F 1/1343; G02F 1/134309; G02F 1/134336; G02F 1/13439
See application file for complete search history.

(56) References Cited

U.S. PATENT DOCUMENTS

| | | | | |
|---|---|---|---|---|
| 2002/0145694 | A1* | 10/2002 | Jang | G02F 1/13452 349/138 |
| 2005/0225708 | A1* | 10/2005 | Oke | G02F 1/134363 349/139 |
| 2006/0221288 | A1* | 10/2006 | Ota | G02F 1/136204 349/143 |
| 2008/0068364 | A1* | 3/2008 | Park | G02F 1/1362 345/206 |

(Continued)

FOREIGN PATENT DOCUMENTS

JP           2008116809           5/2008

*Primary Examiner* — Michael Caley
*Assistant Examiner* — Mariam Qureshi
(74) *Attorney, Agent, or Firm* — Cantor Colburn LLP

(57) ABSTRACT

A liquid crystal display device includes a substrate including a display area in which display pixels are arranged in a row direction and a column direction, a first dummy area, which is adjacent to a first side, in the row direction, of the display area, and a second dummy area, which is adjacent to a second side, in the row direction, of the display area, pixel electrodes on the substrate, the pixel electrodes including display pixel electrodes, which are respectively disposed in the display pixels, first dummy pixel electrodes, which are disposed in the first dummy area in the column direction, and second dummy pixel electrodes, which are disposed in the second dummy area in the column direction, and an alignment layer disposed on the pixel electrodes, where an average thickness of the alignment layer is larger in the first and second dummy areas than in the display area.

16 Claims, 20 Drawing Sheets

(51) Int. Cl.
  *G02F 1/1333* (2006.01)
  *G02F 1/1362* (2006.01)
  *G02F 1/1335* (2006.01)
  *G09G 3/36* (2006.01)
  *G02F 1/133* (2006.01)
  *G02F 1/1368* (2006.01)

(52) U.S. Cl.
  CPC ......... *G09G 3/3688* (2013.01); *G02F 1/1368* (2013.01); *G02F 1/13306* (2013.01); *G02F 1/133514* (2013.01); *G02F 2001/133357* (2013.01); *G02F 2001/134345* (2013.01); *G02F 2201/121* (2013.01); *G02F 2201/123* (2013.01); *G09G 2300/0413* (2013.01); *G09G 2300/0426* (2013.01)

(56) References Cited

U.S. PATENT DOCUMENTS

| | | | |
|---|---|---|---|
| 2010/0007831 A1* | 1/2010 | Ishida | G02F 1/1337 349/125 |
| 2012/0306732 A1* | 12/2012 | Sugihara | G02F 1/134336 345/88 |
| 2013/0162926 A1 | 6/2013 | Kwack et al. | |
| 2014/0368481 A1* | 12/2014 | Tomikawa | G09G 3/3614 345/205 |
| 2016/0070130 A1* | 3/2016 | Yuminami | G02F 1/13452 349/110 |
| 2016/0071884 A1* | 3/2016 | Miyamoto | H01L 27/1251 257/59 |
| 2017/0351152 A1* | 12/2017 | Hashiguchi | G02F 1/136286 |
| 2018/0090522 A1* | 3/2018 | Akiyoshi | H01L 27/1248 |

* cited by examiner

LIQUID CRYSTAL DISPLAY DEVICE AND MANUFACTURING METHOD THEREOF

This application claims priority to Korean Patent Application No. 10-2016-0005168, filed on Jan. 15, 2016, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device and a manufacturing method thereof.

2. Description of the Related Art

A liquid crystal display ("LCD") device has been widely used as a display device of various sizes for use as a smartphone, a monitor for a notebook computer, or a television ("TV"), for example, due to its excellent characteristics such as light weight, thinness, and low power consumption.

An LCD device applies an electric field to a liquid crystal layer interposed between two substrates, and displays a desired image by adjusting an intensity of the electric field so as to adjust an amount of light transmitted through the liquid crystal layer.

The LCD device may be classified into a horizontal field-type LCD device and a vertical field-type LCD device according to a driving method thereof. The horizontal field-type LCD device controls a transmission of light by controlling a motion of liquid crystal molecules in a horizontal direction, and the vertical field-type LCD device controls the transmission of light by controlling a motion of the liquid crystal molecules in a vertical direction.

SUMMARY

During a fabrication of a liquid crystal display ("LCD") device, ionic impurities may be provided in a liquid crystal layer. The ionic impurities may affect a control of an intensity of an electric field applied to the liquid crystal layer. The ionic impurities may accumulate in a particular region of the LCD device, and as a result, pixels in the particular region may appear to be brighter than other pixels in the rest of the LCD device. Thus, a design which minimizes the difference in brightness between regions of the LCD device is desired.

Exemplary embodiments of the invention provide an LCD device which minimizes regional differences in the brightness thereof.

Exemplary embodiments of the invention also provide a manufacturing method of an LCD device which minimizes regional differences in the brightness thereof.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, an LCD device includes a substrate including a display area, in which a plurality of display pixels is arranged in a row direction and a column direction, a first dummy area, which is adjacent to a first side, in the row direction, of the display area, and a second dummy area, which is adjacent to a second side, in the row direction, of the display area, pixel electrodes disposed on the substrate, the pixel electrodes including a plurality of display pixel electrodes, which are respectively disposed in the plurality of display pixels, a plurality of first dummy pixel electrodes, which are disposed in the first dummy area in the column direction, and a plurality of second dummy pixel electrodes, which are disposed in the second dummy area in the column direction, and an alignment layer disposed on the pixel electrodes, where an average thickness of the alignment layer is larger in the first and second dummy areas than in the display area.

In an exemplary embodiment, the LCD device may also include a plurality of data lines disposed on the substrate to extend in the column direction and connected to a plurality of rows of the plurality of display pixel electrodes, a first dummy data line disposed on the substrate to extend in the column direction and connected to a plurality of rows of the plurality of first dummy pixel electrodes, and a second dummy data line disposed on the substrate to extend in the column direction and connected to a plurality of rows of the plurality of second dummy pixel electrodes.

In an exemplary embodiment, the first dummy data line may be connected to a data line disposed on a first outermost side of the display area, and the second dummy data line may be connected to a data line disposed on a second outermost side of the display area.

In an exemplary embodiment, a number of the plurality of rows of the plurality of first dummy pixel electrodes and a number of the plurality of rows of the plurality of second dummy pixel electrodes may be the same as a number of the plurality of rows of the plurality of display pixel electrodes.

In an exemplary embodiment, each of the plurality of first dummy pixel electrodes may include first through third branch electrodes, which extend at an angle of about 45° or less with respect to the column direction, are disposed in series in the row direction, and are parallel to one another. A distance from the first branch electrode to the display area may be larger than a distance from the second branch electrode to the display area, and the distance from the second branch electrode to the display area may be larger than a distance from the third branch electrode to the display area. A distance from a top surface of the first branch electrode to a top surface of a part of the alignment layer overlapping the first branch electrode may be larger than a distance from a top surface of the second branch electrode to a top surface of a part of the alignment layer overlapping the second branch electrode, and the distance from the top surface of the second branch electrode to the top surface of the part of the alignment layer overlapping the first branch electrode may be larger than a distance from a top surface of the third branch electrode to a top surface of a part of the alignment layer overlapping the third branch electrode.

In an exemplary embodiment, an average thickness of a part of the alignment layer overlapping a column of the display pixels adjacent to the first dummy area or the second dummy area may be larger than an average thickness of a part of the alignment layer overlapping a column of the plurality of display pixels not adjacent to the first dummy area or the second dummy area.

In an exemplary embodiment, voltages of the same polarity may be provided to the plurality of first dummy pixel electrodes, and voltages of the same polarity may be provided to the plurality of second dummy pixel electrodes.

In an exemplary embodiment, the average thickness of the alignment layer may be about 710 angstroms (Å) to about 730 Å in the first and second dummy areas and about 590 Å to about 610 Å in the display area.

In an exemplary embodiment, the alignment layer may have a minimum thickness in an area overlapping a column of the plurality of display pixels in the middle of the display area.

In an exemplary embodiment, the LCD device may also include a liquid crystal layer disposed on the alignment layer, where an average intensity of an electric field generated in the liquid crystal layer is weaker in the first and second dummy areas than in the display area.

In an exemplary embodiment, the LCD device may also include a light-shielding member disposed on the alignment layer, where the light-shielding member overlaps the first and second dummy areas.

According to another exemplary embodiment of the invention, an LCD device includes a substrate including a display area, in which a plurality of display pixels is arranged in a row direction and a column direction, a first dummy area, which is adjacent to a first side, in the row direction, of the display area, and a second dummy area, which is adjacent to a second side, in the row direction, of the display area, a common electrode disposed on the substrate, a pixel insulating layer disposed on the common electrode, and pixel electrodes disposed on the pixel insulating layer, where an average thickness of the pixel insulating layer is larger in the first and second dummy areas than in the display area.

In an exemplary embodiment, the LCD device may also include a plurality of data lines, a plurality of first dummy data lines, and a plurality of second dummy data lines disposed on the substrate to extend in the column direction, where the pixel electrodes include a plurality of display pixel electrodes, which are respectively disposed in the plurality of display pixels, a plurality of first dummy pixel electrodes, which are disposed in the first dummy area in the column direction, and a plurality of second dummy pixel electrodes, which are disposed in the second dummy area in the column direction, the data lines are connected to a plurality of rows of the plurality of display pixel electrodes, the first dummy data lines are connected to a plurality of rows of the plurality of first dummy pixel electrodes, and the second dummy data lines are connected to a plurality of rows of the plurality of second dummy pixel electrodes.

In an exemplary embodiment, the first dummy data lines may be connected to a data line disposed on a first outermost side of the display area, and the second dummy data lines may be connected to a data line disposed on a second outermost side of the display area.

In an exemplary embodiment, the pixel insulating layer may include a first sub-pixel insulating layer and a second sub-pixel insulating layer. The first sub-pixel insulating layer may be disposed in the display area, the first dummy area, and the second dummy area and may have a uniform thickness throughout the display area, the first dummy area, and the second dummy area, and the second sub-pixel insulating layer may be disposed in the first dummy area and the second dummy area.

According to another exemplary embodiment of the invention, an LCD device includes a substrate including a display area, in which a plurality of display pixels is arranged in a row direction and a column direction, a first dummy area, which is adjacent to a first side, in the row direction, of the display area, and a second dummy area, which is adjacent to a second side, in the row direction, of the display area, and pixel electrodes disposed on the substrate, the pixel electrodes including a plurality of display pixel electrodes, which are respectively disposed in the display pixels, a plurality of first dummy pixel electrodes, which are disposed in the first dummy area in the column direction, and a plurality of second dummy pixel electrodes, which are disposed in the second dummy area in the column direction, where each of the plurality of display pixel electrodes, the plurality of first dummy pixel electrodes, and the plurality of second dummy pixel electrodes includes a plurality of branch electrodes, which extend in the column direction, and a widthwise length, in the row direction, of the branch electrodes is smaller in the plurality of first and second dummy pixel electrodes than in the plurality of display pixel electrodes.

In an exemplary embodiment, a plurality of slits which extend in the column direction may be defined in each of the plurality of display pixel electrodes, the plurality of first dummy pixel electrodes, and the plurality of second dummy pixel electrodes, and a widthwise direction, in the row direction, of the slits may be larger in the plurality of first and second dummy pixel electrodes than in the plurality of display pixel electrodes.

In an exemplary embodiment, the LCD device may also include a plurality of data lines disposed on the substrate to extend in the column direction and connected to a plurality of rows of the plurality of display pixel electrodes, a first dummy data line disposed on the substrate to extend in the column direction and connected to a plurality of rows of the plurality of first dummy pixel electrodes, and a second dummy data line disposed on the substrate to extend in the column direction and connected to a plurality of rows of the plurality of second dummy pixel electrodes, where the first dummy data line is connected to a data line disposed on a first outermost side of the display area and the second dummy data line is connected to a data line disposed on a second outermost side of the display area.

According to another exemplary embodiment of the invention, a method of manufacturing an LCD device includes preparing a substrate including a display area, in which a plurality of display pixels is arranged in a row direction and a column direction, a first dummy area, which is adjacent to a first side, in the row direction, of the display area, and a second dummy area, which is adjacent to a second side, in the row direction, of the display area, forming pixel electrodes on the substrate, and forming an alignment layer on the pixel electrode such that the alignment layer is thicker in the first and second dummy areas than in the display area.

In an exemplary embodiment, the forming the alignment layer, may include applying an alignment material on the pixel electrodes, drying the alignment material, applying ultraviolet ("UV") light to the alignment material, and performing thermal treatment on the alignment material, and the applying the alignment material, may include applying a larger amount of the alignment material on the first and second dummy areas than on the display area According to the exemplary embodiments, an LCD device which minimizes regional differences in the brightness thereof may be provided.

In addition, a manufacturing method of an LCD device which minimizes regional differences in the brightness thereof may be provided.

Other features and exemplary embodiments will be apparent from the following detailed description, the drawings, and the claims.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
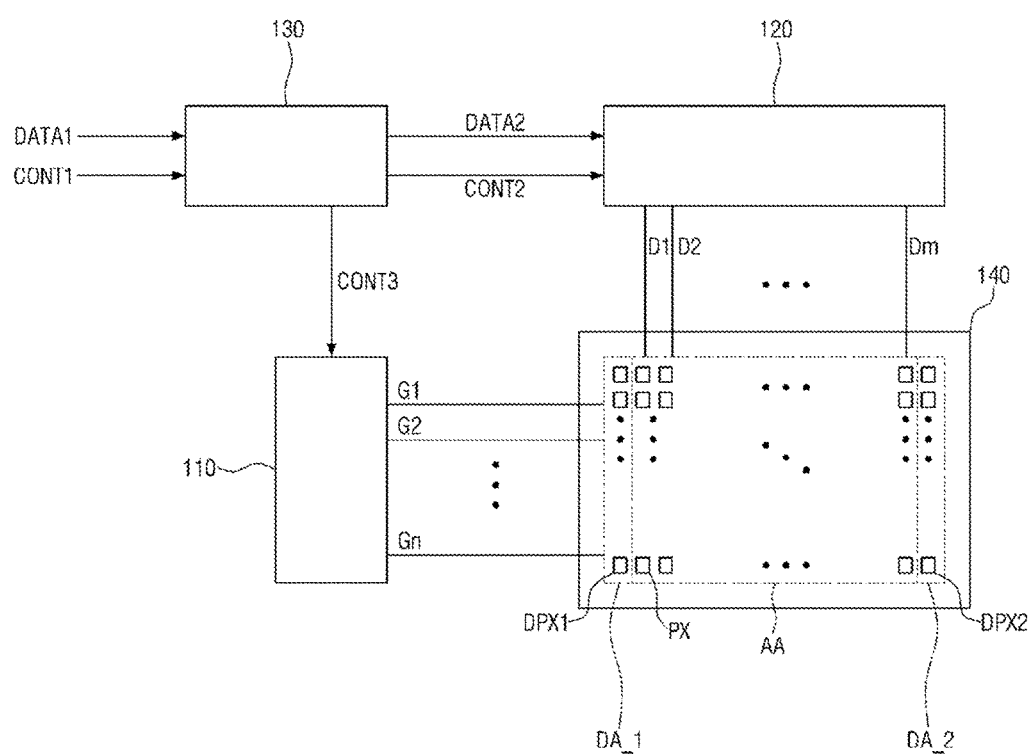
FIG. 1 is a block diagram of an exemplary embodiment of a liquid crystal display ("LCD") device according to the invention.

Advantages and features of the invention and methods of accomplishing the same may be understood more readily by reference to the following detailed description of exemplary embodiments and the accompanying drawings. The invention may, however, be embodied in many different provides and should not be construed as being limited to the embodiments set forth herein. Rather, these embodiments are provided so that this invention will be thorough and complete and will fully convey the concept of the invention to those skilled in the art, and the invention will only be defined by the appended claims. Like reference numerals refer to like elements throughout the specification.

The term "on" that is used to designate that an element is on another element or located on a different layer or a layer includes both a case where an element is located directly on another element or a layer and a case where an element is located on another element via another layer or still another element. In the entire description of the invention, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Exemplary embodiments of the invention will hereinafter be described with reference to the accompanying drawings.

Figure 2:
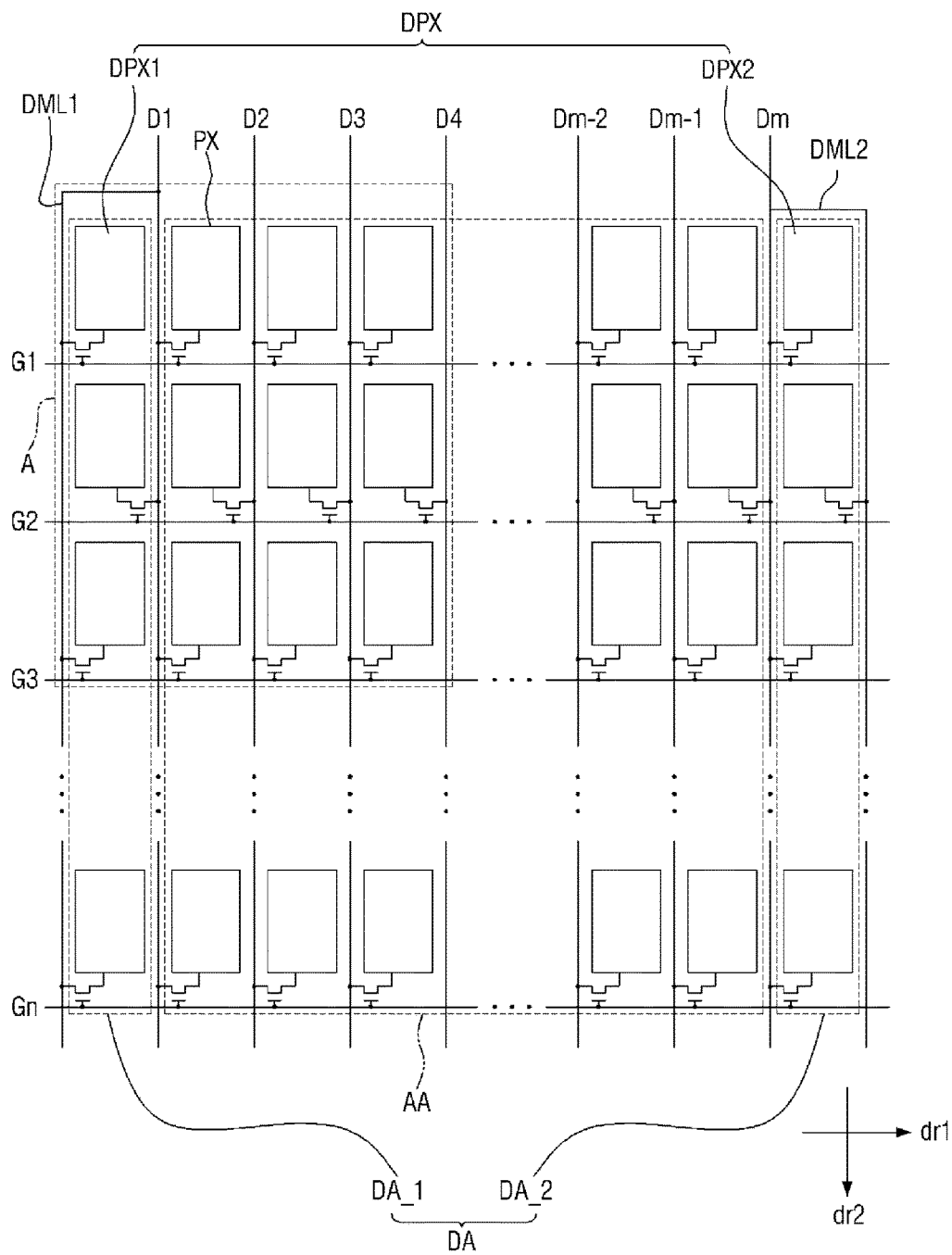
FIG. 2 is an equivalent circuit diagram of pixels of the LCD device of FIG. 1.

FIG. 1 is a block diagram of a liquid crystal display ("LCD") device according to an exemplary embodiment of the invention, and FIG. 2 is an equivalent circuit diagram of pixels of the LCD device of FIG. 1.

Referring to FIGS. 1 and 2, the LCD device according to the exemplary embodiment includes a gate driver 110, a data driver 120, a signal controller 130, and a display panel 140. The display panel 140 includes a plurality of display pixels PX, a plurality of first dummy pixels DPX1, and a plurality of second dummy pixels DPX2. The display pixels PX may be minimal units that are individually controllable in terms of the gray level of an image to be displayed to a user. The first dummy pixels DPX1 and the second dummy pixels DPX2 may also be the minimal units that are individually controllable in terms of the gray level of an image to be displayed to the user, but unlike the display pixels PX, may be hidden from view by a light-shielding member 540 that will be described later.

The display pixels PX may be arranged in a matrix of n rows and m columns, where n and m are natural numbers, and may be disposed in a display area AA in the middle of the display panel 140. The first dummy pixels DPX1 may be disposed in a first dummy area DA_1, which is adjacent to one side, in a row direction, of the display area AA in a row direction. The second dummy pixels DPX2 may be disposed in a second dummy area DA_2, which is adjacent to the other side, in the row direction, of the display area AA.

That is, as illustrated in FIG. 1, the first dummy area DA_1 may be adjacent to the left side of the display area AA, and the second dummy area DA_2 may be adjacent to the right side of the display area AA.

The first dummy pixels DPX1 may be disposed in the first dummy area DA_1 in series along a column direction. The second dummy pixels DPX2 may be disposed in the second dummy area DA_2 in series along the column direction. One first dummy pixel DPX1 and one second dummy pixel DPX2 may be provided for each row of display pixels PX in the display area AA, and the display pixels PX, the first dummy pixels DPX1, and the second dummy pixels DPX2 may be arranged in a matrix form as a whole. That is, the number of rows of first dummy pixels DPX1 and the number of rows of second dummy pixels DPX2 may be the same as the number of rows of display pixels PX.

However, the arrangement of the first and second dummy areas DA_1 and DA_2 is not limited to that set forth herein. That is, in an alternative exemplary embodiment, the first and second dummy areas DA_1 and DA_2 may be respectively adjacent to both sides, in the column direction, of the display area AA or may be disposed in series along both the column direction and the row direction.

The row direction will hereinafter be referred to as a first direction dr1, and may correspond to a direction indicated by an arbitrary straight line from the left to the right of a plane on which the display panel 140 is disposed, as illustrated in FIG. 2. The column direction will hereinafter be referred to as a second direction dr2, and may correspond to a direction indicated by an arbitrary straight line from the top to the bottom of the plane on which the display panel 140 is disposed, as illustrated in FIG. 2.

The display panel 140 may include a plurality of gate lines G1 through Gn, which extend in the first direction dr1, and a plurality of data lines D1 through Dm, which extend in the second direction dr2.

The gate lines G1 through Gn receive gate signals from the gate driver 110, and the data lines D1 through Dm receive data signals from the data driver 120. The display pixels PX may be disposed at the intersections between the gate lines G1 through Gn and the data lines D1 through Dm.

To realize a color display, each of the display pixels PX may uniquely display one of a number of primary colors. Examples of the primary colors include, for example, red, green, and blue. Some of the display pixels PX may display a white color. A display pixel PX displaying a red color will hereinafter be referred to as a red pixel, a display pixel PX displaying a green color will hereinafter be referred to as a green pixel, a display pixel PX displaying a blue color will hereinafter be referred to as a blue pixel, and a display pixel PX displaying a white color will hereinafter be referred to as a white pixel. By controlling the brightnesses of the red pixel, the green pixel, the blue pixel, and the white pixel together, an arbitrary color other than red, green, and blue may be displayed. However, the invention is not limited thereto, and the display pixels PX may display various other colors.

The red pixel, the green pixel, and the blue pixel may be alternately arranged in the first direction dr1, but the invention is not limited thereto. That is, the red pixel, the green pixel, and the blue pixel may also be alternately arranged in the second direction dr2. The pixels PX may be arranged in various manners other than those set forth herein.

The signal controller 130 receives various signals from an external source and controls the gate driver 110 and the data driver 120. More specifically, the signal controller 130 may receive first image data DATA1 and input control signals CONT1, which are for controlling the display of the first image data DATA1, from an external source and may output gate driver control signals CONT3, data driver control signals CONT2, and second image data DATA2.

The first image data DATA1 may include luminance information of each of the display pixels PX. In an exemplary embodiment, the luminance information may have a predefined number of gray levels, for example, 1024 ($=2^{10}$), 256 ($=2^8$), or 64 ($=2^6$) gray levels, but the invention is not limited thereto. The first image data DATA1 may be divided in units of frames.

The input control signals CONT1 transmitted to the signal controller 130 may include, for example, a vertical synchronization signal, a horizontal synchronization signal, a main clock, and a data enable signal, but the invention is not limited thereto. That is, other signals than those set forth herein may also be input to the signal controller 130.

The gate driver control signals CONT3 may be signals for controlling the operation of the gate driver 110 and may be generated by the signal controller 130. The gate driver control signals CONT3 may include, but are not limited to, a scan start signal and a clock signal, but may also include other signals. The gate driver 110 may generate gate signals, which may activate the display pixels PX, according to the gate driver control signals CONT3 and may provide the gate signals to the gate lines G1 through Gn.

The data driver control signals CONT2 may be signals for controlling the operation of the data driver 120 and may be generated by the signal controller 130. The data driver 120 may generate data signals according to the data driver control signals CONT2 and may transmit the data signals to the data lines D1 through Dm.

The driving of the LCD device according to the exemplary embodiment will hereinafter be described with reference to FIGS. 3 and 4.

Figure 3:
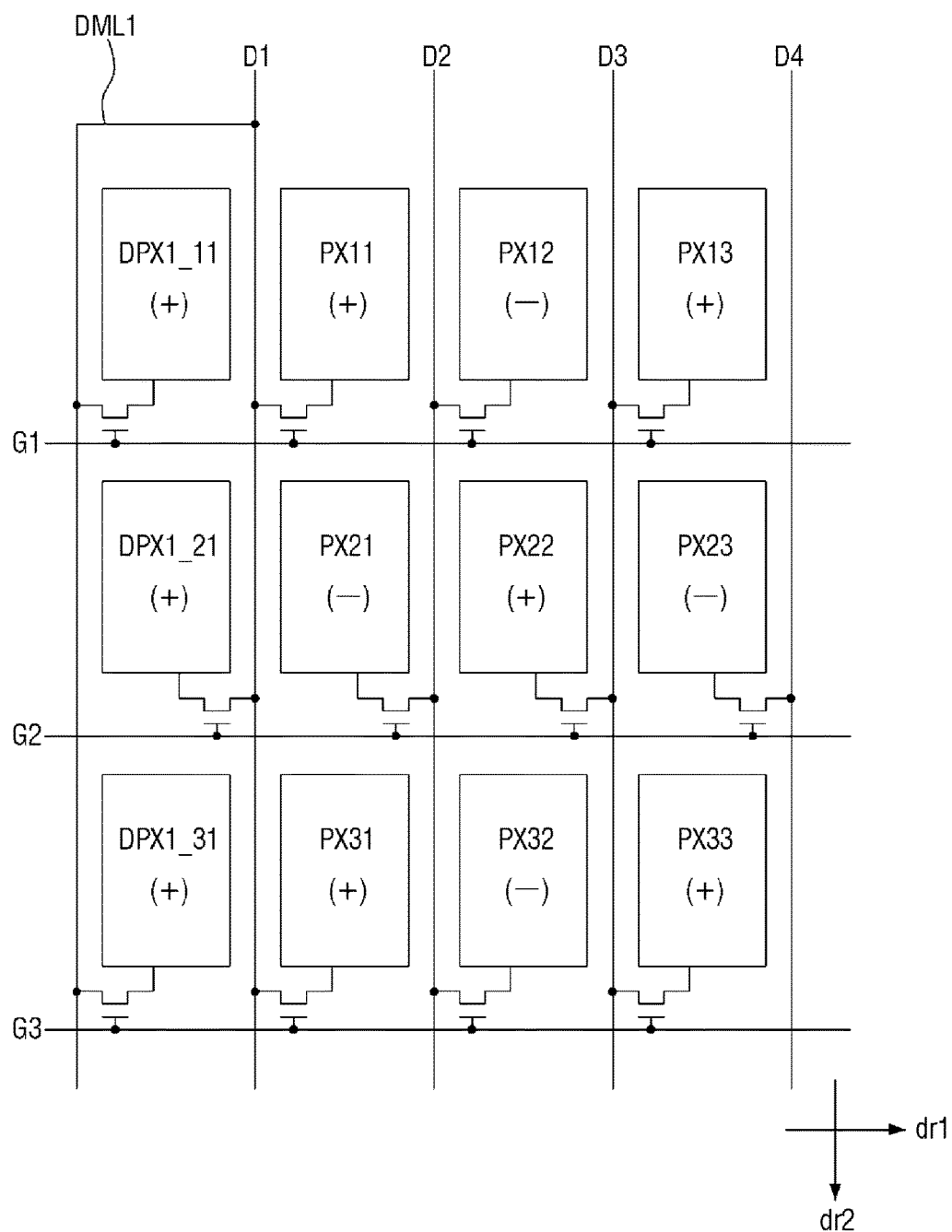
FIG. 3 is an equivalent circuit diagram of pixels in an area A of FIG. 2 in a particular frame.
Figure 4:
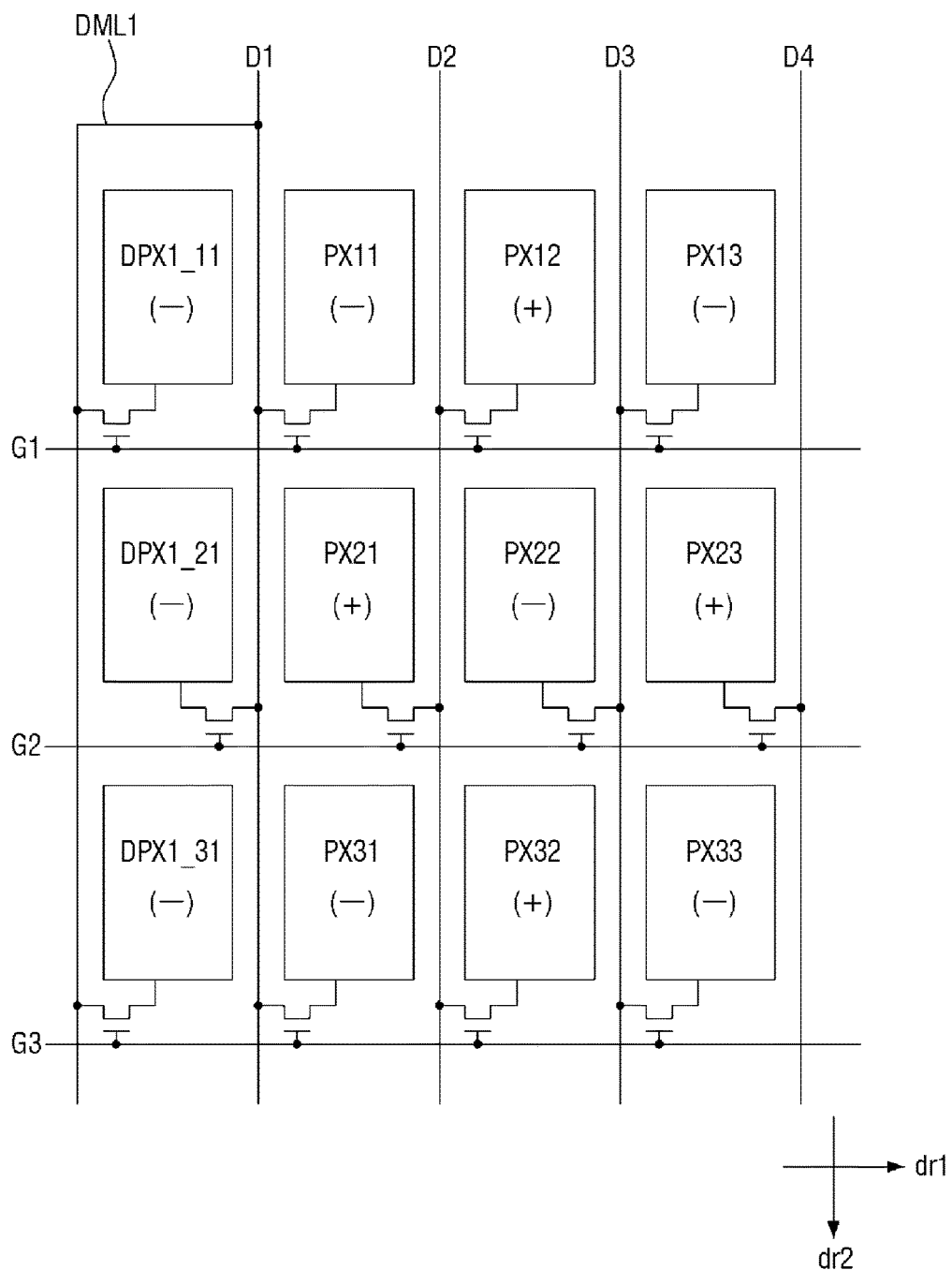
FIG. 4 is an equivalent circuit diagram of the pixels of FIG. 3 in a subsequent frame to the particular frame.

FIG. 3 is an equivalent circuit diagram of pixels in an area A of FIG. 2 in a particular frame, and FIG. 4 is an equivalent circuit diagram of the pixels in the area A in a subsequent frame to the particular frame.

Referring to FIGS. 3 and 4, a pair of adjacent display pixels PX in the same column may be connected to, and may receive data signals from, different data lines. That is, a display pixel PX11 in a first row and a first column of an array of the display pixels PX may be connected to a first data line D1, a display pixel PX21 in a second row and the first column of the array of the display pixels PX may be connected to a second data line D2, a display pixel PX31 in a third row and the first column of the array of the display pixels PX may be connected to the first data line D1, and a display pixel (not shown) in a fourth row and the first column of the array of the display pixels PX may be connected to the second data line D2. In each column, some display pixels PX may be connected to a data line on their left side, and other display pixels PX may be connected to a data line on their right side, and the display pixels PX connected to the data line on their left side and the display pixel PX connected to the data line on their right side may alternately appear in a corresponding column.

Similarly, a display pixel PX12 in the first row and a second column of the array of the display pixels PX may be connected to the second data line D2, a display pixel PX22 in the second row and the second column of the array of the display pixels PX may be connected to a third data line D3, a display pixel PX32 in the third row and the second column of the array of the display pixels PX may be connected to the second data line D2, and a display pixel (not shown) in the fourth row and the second column of the array of the display pixels PX may be connected to the third data line D3. Also, a display pixel PX13 in the first row and a third column of the array of the display pixels PX may be connected to the third data line D3, a display pixel PX23 in the second row and the third column of the array of the display pixels PX may be connected to a fourth data line D4, a display pixel PX33 in the third row and the third column of the array of the display pixels PX may be connected to the third data line D3, and a display pixel (not shown) in the fourth row and the third column of the array of the display pixels PX may be connected to the fourth data line D4.

Due to the aforementioned arrangement of the display pixels PX, an efficient polarity inversion may be performed. More specifically, the LCD device according to the exemplary embodiment may use a polarity inversion driving method in which the voltage of a signal applied to the display pixels PX is periodically inverted to prevent the occurrence of crosstalk and flicker noise, for example. In the polarity inversion driving method, the display pixels PX display an image while having positive polarity (+) or negative polarity (−).

The positive polarity (+) indicates that the voltage of the data signals input to the display pixels PX or the first dummy pixels DPX1 and the second dummy pixels DPX2 is higher than the voltage of a common signal. The negative polarity (−) indicates that the voltage of the data signals input to the display pixels PX or the first dummy pixels DPX1 and the second dummy pixels DPX2 is lower than the voltage of the common signal. That is, the positive polarity (+) or the negative polarity (−) does not necessarily mean supplying a voltage higher than 0V or lower than 0V. Instead, the positive polarity (+) and the negative polarity (−) may be determined based on the relative difference between the voltage of the data signals input to the display pixels PX, the first dummy pixels DPX1 or the second dummy pixels DPX2 and the common signal.

Examples of the polarity inversion driving method include a column inversion driving method, in which each column of display pixels PX have the same polarity, two neighboring columns of display pixels PX have different polarities, and the polarities of the display pixels PX are inverted in units of frames, and a dot inversion driving method, in which neighboring display pixels PX all have different polarities. The column inversion driving method is relatively easy to be implemented, but may not properly prevent crosstalk and flicker noise. The dot inversion driving method is relatively difficult to be implemented, but may effectively prevent crosstalk and flicker noise.

When the connections between the display pixels PX and the data lines D1 through Dm, as illustrated in FIGS. 3 and 4, are used, the data signals may be input to the data lines D1 through Dm in the same manner as the column inversion driving method, and at the same time, the benefits of the dot inversion driving method may be obtained.

More specifically, in one frame, a data signal having the positive polarity (+) may be provided to the first data line D1, a data signal having the negative polarity (−) may be provided to the second data line D2, a data signal having the positive polarity (+) may be provided to the third data line D3, and a data signal having the negative polarity (−) may be provided to the fourth data line D4.

Simply by adjusting the voltages of the data signals input to the first through fourth data lines D1 through D4, the display pixels PX11, PX13, PX22, PX31, and PX33 may be allowed to have the positive polarity (+) in an arbitrary frame, the display pixels PX12, PX21, PX23, and PX32 may be allowed to have the negative polarity (−) in the arbitrary frame, the display pixels PX11, PX13, PX22, PX31, and PX33 may be allowed to have the negative polarity (−) in a subsequent frame to the arbitrary frame, the display pixels PX12, PX21, PX23, and PX32 may be allowed to have the positive polarity (+) in the subsequent frame to the arbitrary frame.

That is, by adjusting the voltages of the data signals applied to the data lines D1 through Dm, each pair of adjacent display pixels PX in the first direction dr1 or the second direction dr2 may be allowed to have different polarities, and thus, the benefits of dot inversion driving may be obtained.

The first dummy area DA_1 (refer to FIG. 2) and the second dummy area DA_2 (refer to FIG. 2) are disposed on the outside of the display area AA (refer to FIG. 2). In the first dummy area DA_1, the first dummy pixels DPX1 (refer to FIG. 2) are disposed in series in the second direction dr2, and in the second dummy area DA_2, the second dummy pixels DPX2 (refer to FIG. 2) are disposed in series in the second direction dr2. The dummy pixels DPX (refer to FIG. 2) may allow a polarity inversion driving of the display pixels PX to be properly performed.

More specifically, display pixels PX are not disposed on the left side of the first data line D1, which is connected to the display pixels PX11 and PX31, and the display pixels PX11 and PX31 are disposed on the right side of the first data line D1. Accordingly, the number of display pixels PX connected to the first data line D1 may differ from the number of display pixels PX connected to each of the second through fourth data lines D2 through D4, and thus, the first data line D1 may exhibit different operating properties from the second through fourth data lines D2 through D4.

Thus, by disposing a first dummy pixel DPX1 (i.e., a first dummy pixel DPX1_11 in a first row and a first column of an array of the first dummy pixels DPX) on the left side of the first data line D1, the first through fourth data lines D1 through D4 may be allowed to exhibit the same operating properties. Also, by additionally disposing not only a first dummy pixel DPX1_21 in a second row and the first column of the array of the first dummy pixels DPX, but also a first dummy pixel DPX1_11 in the first row and the first column of the array of the first dummy pixels DPX and a first dummy pixel DPX1_31 in a third row and the first column of the array of the first dummy pixels DPX, the display pixels PX and the first dummy pixels DPX1 may be allowed to form a matrix together as a whole. As a result, the display quality of an image displayed in the display area AA may become uniform.

A first dummy data line DML1, which provide the data signals to the first dummy pixels DPX1_11 through DPX1_31, may be connected to the first data line D1 and may thus receive the data signals from the first data line D1. Since an area in which to display an image to the user is the display area AA and the first dummy area DA_1 is covered by the light-shielding member 540 and is thus hidden from view from the user regardless of what gray level it has, the first dummy pixels DPX1 may not be provided with the data signals by additional data lines.

The aforementioned descriptions of the first dummy area DA_1 and the first dummy pixels DPX1 are directly applicable to the second dummy area DA_2 and the second dummy pixels DPX2.

Due to the arrangement of the first dummy pixels DPX1 and the second dummy pixels DPX2 and the polarity inversion driving of the display pixels PX, the display pixels PX in the first column of the display area AA may appear to be brighter than they are supposed to. This is because ionic impurities remaining in a liquid crystal layer 400 that will be described later accumulate in a dummy area DA and on the outside of the display area AA where the dummy area DA is disposed.

More specifically, ionic impurities that may be provided during the fabrication of the LCD device according to the exemplary embodiment may remain in the liquid crystal layer 400. The ionic impurities may distort the difference between the voltage of the data signals and the voltage of the common signal and may thus cause the dummy pixels DPX or the display pixels PX to have a higher gray level than they are supposed to. The ionic impurities are generally evenly distributed in the display area AA and are thus not much problematic in the display area AA. However, in the first and second dummy areas DA_1 and DA_2, the ionic impurities may accumulate intensively and may thus cause problems.

For example, ionic impurities having the negative polarity (−) may exist in an area where the display pixel PX22 is disposed. In this case, the display pixels PX12, PX21, PX23, and PX32 all have the negative polarity (−), and thus, the ionic impurities having the negative polarity (−) may not much move.

When ionic impurities having the negative polarity (−) exist in an area where the display pixel PX11 is disposed, the ionic impurities may move to an area where the first dummy pixel DPX1_11 is disposed because the first dummy pixel DPX neighboring the display pixel PX11, i.e., the first dummy pixel DPX1_11, has the positive polarity (+), even though display pixels neighboring the display pixel PX11, i.e., the display pixels PX12 and PX21, both have the negative polarity (−).

As the aforementioned process continues, ionic impurities may accumulate not only in the first dummy area DA_1, but also on the outside of the display area AA adjacent to the first dummy area DA_1. Consequently, even though the first dummy area DA_1 is covered by the light-shielding member 540 and is thus hidden from view from the user, the display pixels PX on the left side of the dummy area DA_1 may appear to be brighter than the display pixels PX in the middle of the display area AA due to the ionic impurities accumulated on the outside of the display area AA adjacent to the first dummy area DA_1, and this phenomenon may also occur on the right side of the display area AA adjacent to the second dummy area DA_2.

This phenomenon may be minimized by the structure of a first alignment layer 320, which will hereinafter be described with reference to FIGS. 5 through 7.

Figure 5:
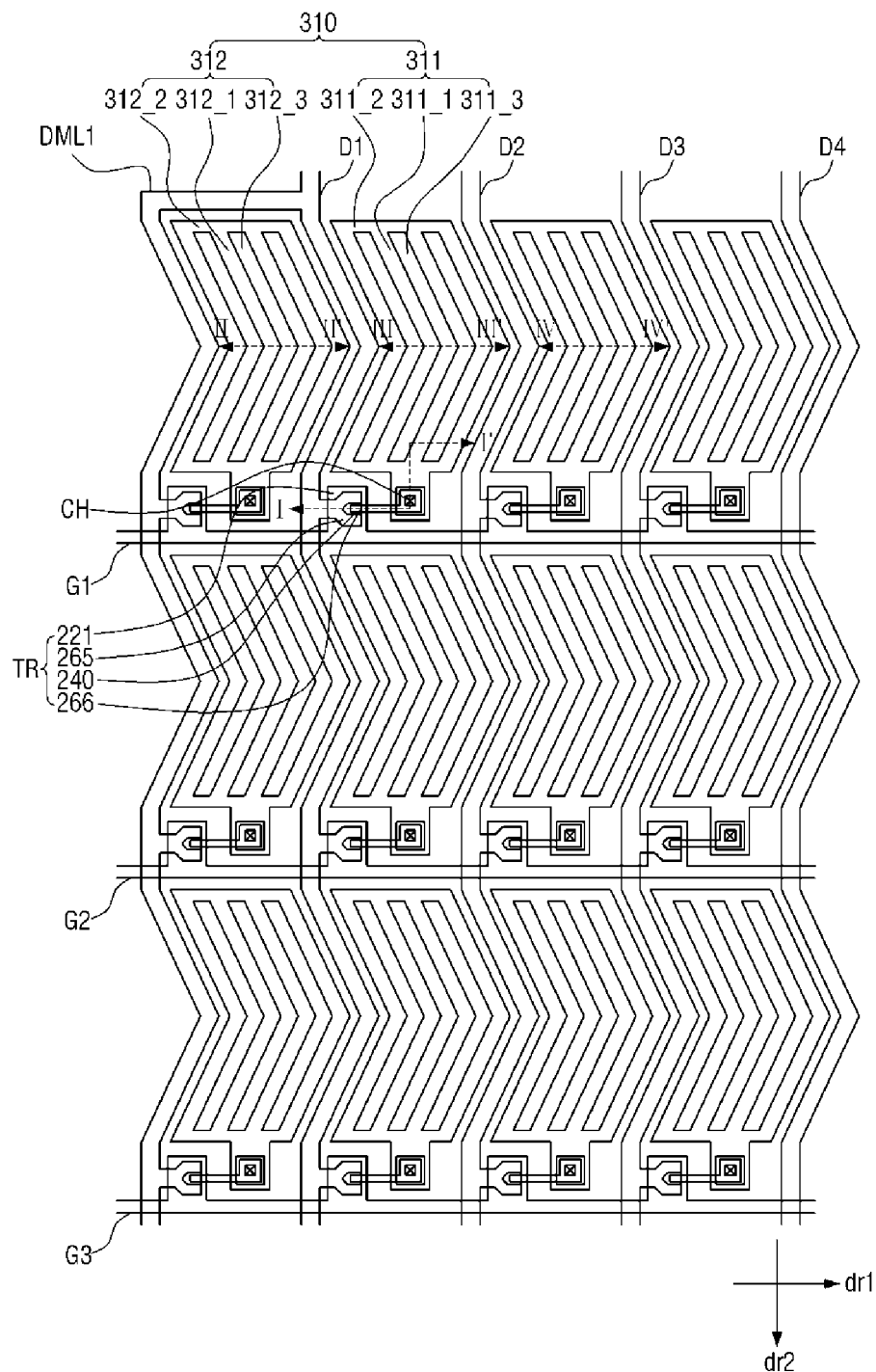
FIG. 5 is a plan view of the pixels in the area A of FIG. 2.
Figure 6:
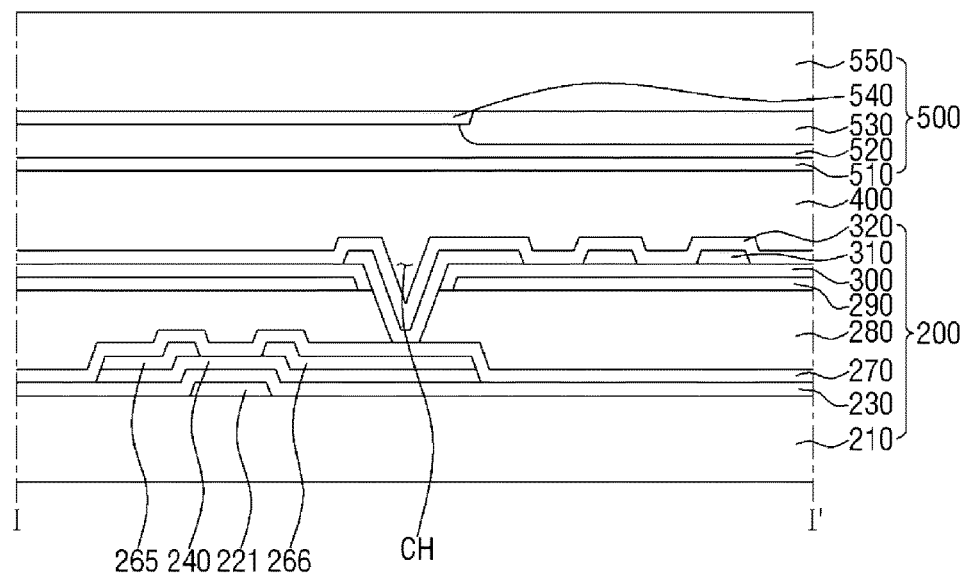
FIG. 6 is a cross-sectional view taken along line I-I' of FIG. 5.
Figure 7:
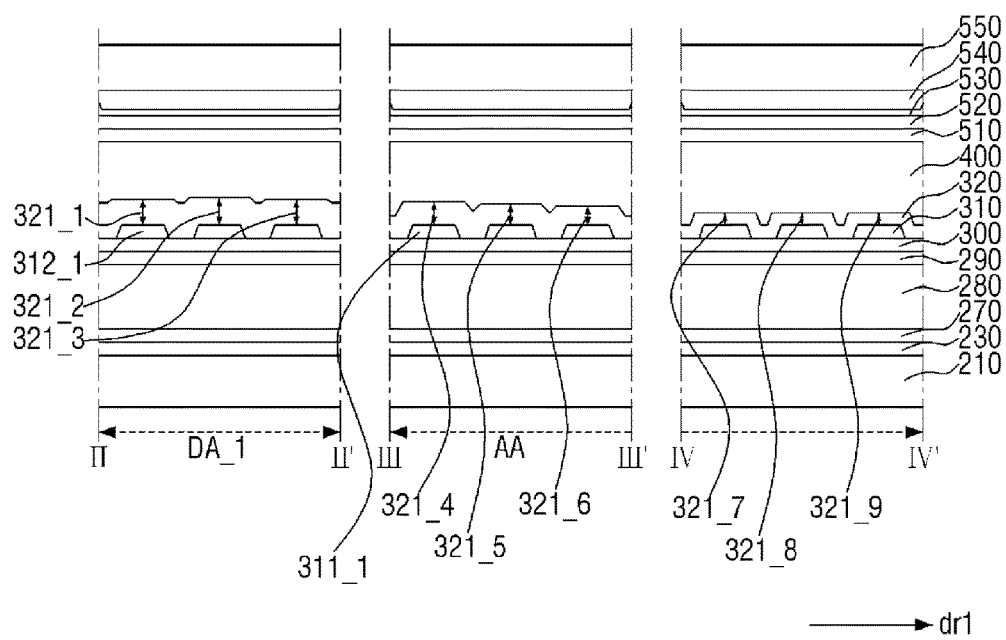
FIG. 7 is a cross-sectional view taken along lines II-II', III-III', and IV-IV' of FIG. 5.

FIG. 5 is a plan view of the pixels in the area A of FIG. 2, FIG. 6 is a cross-sectional view taken along line I-I' of FIG. 5, and FIG. 7 is a cross-sectional view taken along lines and IV-IV' of FIG. 5.

Referring to FIGS. 5 through 7, the display panel 140 (refer to FIG. 1) includes an array substrate 200, an opposite substrate 500, and the liquid crystal layer 400.

The array substrate 200 is a substrate on which transistors TR for controlling liquid crystal molecules in the liquid crystal layer 400 are disposed, and the opposite substrate 500 is a substrate facing the array substrate 200.

The array substrate 200 will hereinafter be described.

The array substrate 200 includes a first base substrate 210. The first base substrate 210 may be a transparent insulating substrate. In an exemplary embodiment, the first base substrate 210 may be provided as a glass substrate, a quartz substrate, or a transparent resin substrate, for example. The first base substrate 210 may comprise a polymer or plastic with high thermal resistance. The first base substrate 210 may be in the form of a flat panel, but may be curved in a particular direction. In an exemplary embodiment, the first base substrate 210 may be rectangular with four sides in a plan view, for example. In an alternative exemplary embodiment, the first base substrate 210 may include various other shapes such as polygonal other than rectangular, circular, or may have one or more curved sides.

The gate lines G1 through Gn and gate electrodes 221 are disposed on the first base substrate 210. As mentioned above, the gate lines G1 through Gn may extend in the first direction dr1. The gate lines G1 through Gn and the gate electrodes 221 may transmit gate signals.

The gate signals may be signals having a varying voltage, provided by the gate driver 110, and the TFTs TR may be controlled to be turned on or off according to the voltage of the gate signals.

The gate electrodes 221 may protrude from the gate lines G1 through Gn and may form the TFTs TR.

In an exemplary embodiment, the gate lines G1 through Gn and the gate electrodes 221 may comprise an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), tantalum (Ta), titanium (Ti), or the like.

The gate lines G1 through Gn and the gate electrodes 221 may have a single-layer structure or may have a multilayer structure including at least two conductive films having different physical properties. In an exemplary embodiment, one of the at least two conductive films may include a low-resistance metal, for example, an Al-based metal, an Ag-based metal, a Cu-based metal, or the like, so as to prevent signal delays or voltage drops in the gate lines G1 through Gn and the gate electrodes 221, and another conductive film may include a material with excellent contact properties with respect to indium tin oxide ("ITO") and indium zinc oxide ("IZO"), such as a Mo-based metal, Cr, Ti, Ta, or the like. Examples of the multilayer structure of the gate lines G1 through Gn and the gate electrodes 221 include the combination of a Cr lower film and an Al upper film and the combination of an Al lower film and a Mo upper film, but the invention is not limited thereto. That is, the gate lines G1 through Gn and the gate electrodes 221 may be provided using various metals and conductors other than those set forth herein.

A gate insulating layer 230 is disposed on the gate lines G1 through Gn and the gate electrodes 221. The gate insulating layer 230 may insulate elements that are disposed below the gate insulating layer 230, such as the gate lines G1 through Gn and the gate electrodes 221, from elements that are disposed on the gate insulating layer 230 may include an insulating material. The gate insulating layer 230 may include an insulating material. In an exemplary embodiment, the gate insulating layer 230 may include silicon nitride, silicon oxide, silicon oxynitride, or a high dielectric constant material, for example. The gate insulating layer 230 may have a single-layer structure or may have a multilayer structure including two insulating films having different physical properties.

Semiconductor layers 240 are disposed on the gate insulating layer 230. The semiconductor layers 240 may at least partially overlap the gate electrodes 221. In an exemplary embodiment, the semiconductor layers 240 may comprise amorphous silicon, polycrystalline silicon, or an oxide semiconductor, for example.

Although not specifically illustrated, ohmic contact members may be further provided on the semiconductor layers 240. The ohmic contact members may include n+ hydrogenated amorphous silicon doped with a high concentration of n-type impurities, or silicide. The ohmic contact members may be disposed on the semiconductor layers 240, being paired with other ohmic contact members. In response to the semiconductor layers 240 being including an oxide semiconductor, the ohmic contact members may not be provided.

The data lines D1 through Dm, the first dummy data line DML1, the second dummy data line DML2 (refer to FIG. 2), source electrodes 265, and drain electrodes 266 are disposed on the semiconductor layers 240 and the gate insulating layer 230.

The data lines D1 through Dm extend in the second direction dr2. The data lines D1 through Dm may be insulated from the gate lines G1 through Gn by the gate insulating layer 230.

The data lines D1 through Dm may provide the data signals provided thereto from the data driver 120 to the display pixels PX. The data signals may be signals having a varying voltage, provided by the data driver 120, and the gray level of the display pixels PX may be controlled according to the data signals.

The first dummy data line DML1 extends in the second direction dr2. The first dummy data line DML1 may be connected to the first data line D1, which is adjacent to the first dummy data line DML1. A part of the first dummy data line DML1 may extend in a direction other than the second direction dr2 to be connected to the first data line D1. The first dummy data line DML1 may be insulated from the gate lines G1 through Gn by the gate insulating layer 230.

The second dummy data line DML2 extends in the second direction dr2. The second dummy data line DML2 may be connected to an m-th data line Dm, which is adjacent to the second dummy data line DML2. A part of the second dummy data line DML2 may extend in a direction other than the second direction dr2 to be connected to the m-th data line Dm. The second dummy data line DML2 may be insulated from the gate lines G1 through Gn by the gate insulating layer 230.

The first dummy data line DML1 may be connected to the first data line D1 and may thus provide the data signals received from the first data line D1 to the first dummy pixels DPX1 (refer to FIG. 2). The gray level of the first dummy pixels DPX1 may be controlled according to the data signals provided by the first dummy data line DML1.

Similarly, the second dummy data line DML2 may be connected to the m-th data line Dm and may thus provide the data signals received from the m-th data line Dm to the second dummy pixels DPX2. The gray level of the second dummy pixels DPX2 may be controlled according to the data signals provided by the second dummy data line DML2.

The source electrodes 265 may be branched off, and protrude, from the data lines D1 through Dm, the first dummy data line DML1, and the second dummy data line DML2. The source electrodes 265 may receive the data signals from the data lines D1 through Dm, the first dummy data line DML1, and the second dummy data line DML2.

The drain electrodes 266 may be spaced from the source electrodes 265.

As illustrated in FIG. 5, the source electrodes 265 may be U-shaped, for example, surrounding the drain electrodes 266. However, the shapes of the source electrodes 265 and the drain electrodes 266 are not limited to the example illustrated in FIG. 5. That is, first sides of the source electrodes 265 may be spaced from first sides of the drain electrodes 266 by a predetermined distance such that the source electrodes 265 and the drain electrodes 266 may be disposed in parallel to each other.

The semiconductor layers 240 may be disposed in the gaps between the drain electrodes 266 and the source electrodes 265, which are spaced from each other. That is, the drain electrodes 266 and the source electrodes 265 may face each other with the semiconductor layers 240 disposed therebetween, while partially overlapping or contacting the semiconductor layers 240.

In an exemplary embodiment, the data lines D1 through DM, the first dummy data line DML1, the second dummy data line DML2, the source electrodes 265, and the drain electrodes 266 may include Al, Cu, Ag, Mo, Cr, Ti, Ta or an alloy thereof, for example, and may have a multilayer structure including a lower film including a refractory metal and a low-resistance upper film disposed on the lower film.

The gate electrodes 221, the source electrodes 265, and the drain electrodes 266 may form the transistors TR, which are switching devices, together with the semiconductor layers 240.

The transistors TR may electrically connect the source electrodes 265 and the drain electrodes 266 according to the voltage of the gate signals provided to the gate electrode 221. More specifically, when the voltage of the gate signals provided to the gate electrodes 221 is for turning off the transistors TR, the source electrodes 265 and the drain electrodes 266 are not electrically connected. When the voltage of the gate signals provided to the gate electrodes 221 for turning on the transistors TR, the source electrodes 265 and the drain electrodes 266 are electrically connected via channels defined in the semiconductor layers 240.

Channels may be defined mostly in areas between the source electrodes 265 and the drain electrodes 266. That is, when the transistors TR are on, channels may be defined mostly in the semiconductor layers 240 between the source electrodes 265 and the drain electrodes 266, and a voltage and a current may be transmitted along the channels.

As a result, the data signals may be provided to elements connected to the drain electrodes 266, other than the semiconductor layers 240, and the transmission of the data signals may be controlled by the gate signals provided to the gate lines G1 through Gn.

The transistors TR may be disposed in the display pixels PX, and may also be disposed in the first dummy pixels DPX1 and the second dummy pixels DPX2.

A passivation layer 270 is disposed on the data lines D1 through Dm, the first dummy data line DML1, the second dummy data line DML2, the source electrodes 265, the drain electrodes 266, and the semiconductor layers 240. The passivation layer 270 may include an inorganic insulating material, and may cover and protect the data lines D1 through Dm, the first dummy data line DML1, the second dummy data line DML2, and the transistors TR, which are all disposed below the passivation layer 270.

A planarization layer 280 is disposed on the passivation layer 270. The planarization layer 280 may planarize the top surface of the passivation layer 270 on which height differences are provided due to the presence of the gate lines G1 through Gn, the data lines D1 through Dm, the first data dummy line DML1, the second dummy data line DML2, and the transistors TR. The planarization layer 280 may include an organic material. In an exemplary embodiment, the planarization layer 280 may include a photosensitive organic composition, for example. In another exemplary embodiment, the planarization layer 280 may not be provided.

Contact holes CH, which expose parts of the transistors TR, and particularly, parts of the drain electrodes 266, may be defined in the planarization layer 280 and the passivation layer 270. The contact holes CH may be defined in a shape that vertically penetrates the planarization layer 280 and the passivation layer 270. Accordingly, the contact holes CH may expose and at the same time overlap parts of the drain electrodes 266. The contact holes CH may be defined in the display pixels PX, the first dummy pixels DPX1, and the second dummy pixels DPX2.

A common electrode 290 is disposed on the planarization layer 280. The common electrode 290 may be provided in a planar shape in an entire area except for an area in which the contact hole CH is defined and the surroundings of the area in which the contact hole CH is defined. In an exemplary embodiment, the common electrode 290 may include a transparent conductive material such as ITO, IZO, indium tin zinc oxide ("ITZO"), or Al-doped zinc oxide ("AZO"). A common voltage may be applied to the common electrode 290, and thus, the common electrode 290 may generate an electric field in the liquid crystal layer 400 together with pixel electrodes 310 that will be described later.

A pixel insulating layer 300 is disposed on the common electrode 290. The pixel insulating layer 300 may include an inorganic insulating material. The pixel insulating layer 300 may insulate the common electrode 290, which is disposed below the pixel insulating layer 300, and the pixel electrodes 310, which are disposed on the pixel insulating layer 300. Accordingly, an electric field may be generated by a difference between the voltage applied to the common electrode 290 and the voltage applied to the pixel electrodes 310.

The pixel electrodes 310 are disposed on the pixel insulating layer 300. The pixel electrodes 310 may be physically connected to the drain electrodes 266 via the contact holes CH and may thus receive the data signals from the drain electrodes 266. In an exemplary embodiment, the pixel electrodes 310 may include a transparent conductive material such as ITO, IZO, ITZO, or AZO. The pixel electrodes 310, unlike the common electrode 290, which is provided as a plate regardless of the distinction between pixels, may be provided separately in the display pixels PX, the first dummy pixels DPX1, and the second dummy pixels DPX2.

The pixel electrodes 310 include display pixel electrodes 311, which are disposed in the display pixels PX, first dummy pixel electrodes 312, which are disposed in the first dummy pixels DPX1, and second dummy pixel electrodes (not shown), which are disposed in the second dummy pixels DPX2.

The first dummy pixel electrodes 312 are disposed in the first dummy pixels DPX1 and may thus be provided in the first dummy area DA_1 in the second direction dr2, and the second dummy pixel electrodes (not shown) are disposed in the second dummy pixels DPX2 and may thus be provided in the second dummy area DA_2 in the second direction dr2. Since the number of rows of the first dummy pixels DPX1 and the number of rows of the second dummy pixels DPX2 are the same as the number of rows of the display pixels PX, as mentioned above, the number of rows of the first dummy pixel electrodes 312 and the number of rows of the second dummy pixel electrodes (not shown) may be the same as the number of rows of the display pixel electrodes 311.

Each of the display pixel electrodes 311 includes a plurality of display branch electrodes 311_1 and display connecting electrodes 311_2, which connect the display branch electrodes 311_1. The display branch electrodes 311_1 extend in a direction similar to the second direction dr2. In an exemplary embodiment, the direction similar to the second direction dr2 may be a direction with an absolute crossing angle of less than about 45° with respect to the second direction dr2, for example. The display branch electrodes 311_1 may be tilted at different angles within the range of the direction similar to the second direction dr2. In the exemplary embodiment, each of the display branch electrodes 311_1 may include a section extending in a slanting direction counterclockwise from the second direction dr2 and a section extending in a slanting direction clockwise from the second direction dr2.

The display branch electrodes 311_1 are spaced from one another and are disposed in parallel to one another. Display slits 311_3 are defined among the display branch electrodes 311_1. The display branch electrodes 311_1, the display slits 311_3 and the common electrode 290, which are disposed between the display branch electrodes 311_1 and the display slits 311_3, interact with one another to generate an electric field with a particular directivity, and the liquid crystal molecules in the liquid crystal layer 400 may be controlled by the electric field.

The display connecting electrodes 311_2 may extend in the first direction dr1 and electrically and physically connect the display branch electrodes 311_1. Accordingly, in a case in which a voltage is provided to the display branch electrodes 311_1 or the display connecting electrodes 311_2, the voltage may be transmitted to all the display branch electrodes 311_1 and all the display connecting electrodes 311_2.

However, the invention is not limited to the exemplary embodiment. That is, the display branch electrodes 311_1 may extend in a direction similar to the first direction dr1, and the display connecting electrodes 311_2 may extend in the second direction dr2. The direction similar to the first direction dr1 may be a direction with an absolute crossing angle of less than about 45° with respect to the first direction dr1.

Each of the first dummy pixel electrodes 312, like each of the display pixel electrodes 311, includes a plurality of first dummy branch electrodes 312_1 and first dummy connecting electrodes 312_2, which connect the first dummy branch electrodes 312_1. First dummy slits 312_3 are defined among the first dummy branch electrodes 312_1. The first dummy branch electrodes 312_1 have the same shape and the same characteristics as those of the display branch electrodes 311_1, the first dummy connecting electrodes 312_2 have the same shape and the same characteristics as those of the display connecting electrodes 311_2, and the first dummy slits 312_3 have the same shape and the same characteristics as those of the display slits 311_3. Accordingly, detailed descriptions of the first dummy branch electrodes 312_1, the first dummy connecting electrodes 312_2, and the first dummy slits 312_3 will be omitted.

Each of the second dummy pixel electrodes (not shown), like each of the first dummy pixel electrodes 312, includes a plurality of second dummy branch electrodes (not shown) and second dummy connecting electrodes (not shown), which connect the second dummy branch electrodes (not shown), and detailed descriptions of the second dummy branch electrodes (not shown) and the second dummy connecting electrodes (not shown) will be omitted.

The first alignment layer 320 is disposed on the pixel electrodes 310. The first alignment layer 320 may pretilt the liquid crystal molecules in the liquid crystal layer 400. That is, in a case in which an electric field is yet to be applied to the liquid crystal layer 400, the first alignment layer 320 may align the liquid crystal molecules in the liquid crystal layer 400 to be directed to a predetermined direction from a plane where the first alignment layer 320 is disposed and may align the liquid crystal molecules in the liquid crystal layer 400 to define an angle of about 0.5° to about 3° with respect to a direction perpendicular to the plane where the first alignment layer 320 is disposed.

The thickness of the first alignment layer 320 may differ from one area to another area. More specifically, the average thickness of the first alignment layer 320 may be larger in the first and second dummy areas DA_1 and DA_2 than in the display area AA.

That is, the distance from a location on the surface of the pixel electrodes 310 in the first dummy pixels DPX1 or the second dummy pixels DPX2 to a corresponding location on the surface of the first alignment layer 320 may be larger than the distance from a location on the surface of the pixel electrodes 310 in the display pixels PX to a corresponding location on the surface of the first alignment layer 320.

In an exemplary embodiment, the first alignment layer 320 may have an average thickness of about 710 angstroms (Å) to about 730 Å in the first dummy area DA_1 or the second dummy area DA_2 and an average thickness of about 590 Å to about 610 Å in the display area AA, for example. In the exemplary embodiment, the first alignment layer 320 may have an average thickness of about 720 Å in the first dummy area DA_1 or the second dummy area DA_2 and an average thickness of about 600 Å in the display area AA, for example.

In the first dummy area DA_1 or the second dummy area DA_2, the first dummy pixels DPX1 or the second dummy pixels DPX2 are disposed, and in the display area AA, the display pixels PX are disposed. Thus, the average thickness of the first alignment layer 320 has been described in consideration of error in the thickness of the first alignment layer 320 on the pixel electrodes 310. Accordingly, although not specifically illustrated, the thickness of the first alignment layer 320 may be less in an exceptional part of the first dummy area DA_1 or the second dummy area DA_2 than in an exceptional part of the display area AA. However, the average thickness of the first alignment layer 320 may be generally larger in the first dummy area DA_1 or the second dummy area DA_2 than in the display area AA.

Also, the thickness of the first alignment layer 320 may differ within the first dummy area DA_1 or the second dummy area DA_2. That is, the first alignment layer 320, which overlaps the first dummy branch electrodes 312_1, may be relatively thick over first dummy branch electrodes 312_1 that are relatively apart from the display area AA.

More specifically, FIG. 7 illustrates the distances from the surface of the pixel electrodes 310 to the surface of the first alignment layer 320 at three locations on each of lines II-II' III-III' and IV-IV' of FIG. 5.

The top surface of a first dummy branch electrode 312_1 on the left side of the first dummy pixel DPX1_11 (refer to FIG. 3) is spaced from the top surface of the first alignment layer 320 by a first length 321_1, the top surface of a first dummy branch electrode 312_1 in the middle of the first dummy pixel DPX1_11 is spaced from the top surface of the first alignment layer 320 by a second length 321_2, and the top surface of a first dummy branch electrode 312_1 on the right side of the first dummy pixel DPX1_11 is spaced from the top surface of the first alignment layer 320 by a third length 321_3.

The top surface of a display branch electrode 311_1 on the left side of the display pixel PX11 (refer to FIG. 3) is spaced from the top surface of the first alignment layer 320 by a fourth length 321_4, the top surface of a display branch electrode 311_1 in the middle of the display pixel PX11 is spaced from the top surface of the first alignment layer 320 by a fifth length 321_5, and the top surface of a display branch electrode 311_1 on the right side of the display pixel PX11 is spaced from the top surface of the first alignment layer 320 by a sixth length 321_6.

The top surface of a display branch electrode 311_1 on the left side of the display pixel PX12 (refer to FIG. 3) is spaced from the top surface of the first alignment layer 320 by a seventh length 321_7, the top surface of a display branch electrode 311_1 in the middle of the display pixel PX12 is spaced from the top surface of the first alignment layer 320 by an eighth length 321_8, and the top surface of a display branch electrode 311_1 on the right side of the display pixel PX12 is spaced from the top surface of the first alignment layer 320 by a ninth length 321_9.

The average of the first, second, and third lengths 321_1, 321_2, and 321_3 may be greater than the average of the fourth, fifth, and sixth lengths 321_4, 321_5, and 321_6, and the average of the fourth, fifth, and sixth lengths 321_4, 321_5, and 321_6 may be greater than the average of the seventh, eighth, and ninth lengths 321_7, 321_8, and 321_9.

The first length 321_1 may be greater than the second length 321_2, and the second length 321_2 may be greater than the third length 321_3. That is, the first alignment layer 320 may be thicker when the first alignment layer 320 is farther from the display area AA.

The fourth length 321_4 may be greater than the fifth length 321_5, and the fifth length 321_5 may be greater than the sixth length 321_6. That is, the first alignment layer 320 may be thicker when the first alignment layer 320 is closer to a side of the display area AA.

The seventh, eighth, and ninth lengths 321_7, 321_8, and 321_9 may all be the same. That is, the thickness of the first alignment layer 320 may be more uniform when the first alignment layer 320 is closer to the center of the display area AA. Each of the seventh, eighth, and ninth lengths 321_7, 321_8, and 321_9 is illustrated as corresponding to the thickness of the first alignment layer 320 at each of three locations in a second display pixel PX from the side of the display area AA, but the invention is not limited thereto. That is, the first alignment layer 320 may not necessarily have the same thickness at each of the three locations in the second display pixel PX from the side of the display area AA. In other words, in general, the thickness of the first alignment layer 320 may be uniform for display pixels PX adjacent to the center of the display area AA and may vary noticeably for display pixels adjacent to the side of the display area AA.

Due to regional differences in the thickness of the first alignment layer 320, regional differences in the brightness of the display pixels PX that may occur in the display area AA may be minimized.

As will become apparent, the liquid crystal layer 400 may be disposed on the first alignment layer 320. An electric field is generated in the liquid crystal layer 400 due to a difference between the voltage provided to the pixel electrodes 310 and the voltage provided to the common electrode 290, and the liquid crystal molecules in the liquid crystal layer 400 are realigned by the electric field. Since the thickness of the first alignment layer 320 is larger in the first and second dummy areas DA_1 and DA_2 than in the display area AA, the distance from the pixel electrodes 310 to the liquid crystal layer 400 and the distance from the common electrode 290 to the liquid crystal layer 400 may be larger in the first and second dummy areas DA_1 and DA_2 than in the display area AA.

The voltage provided to the first dummy pixel electrodes 312 in the first dummy area DA_1 and the voltage provided to the second dummy pixel electrodes (not shown) in the second dummy area DA_2 may be the same as the voltage provided to the display pixel electrodes 311 in the display area AA, and the voltage provided to the common electrode 290 in the first and second dummy areas DA_1 and DA_2 may be the same as the voltage provided to a part of the common electrode 290 in the display area AA. Accordingly, the intensity of an electric field generated by the first dummy pixel electrodes 312, the second dummy pixel electrodes (not shown), and the common electrode 290 may be the same as the intensity of an electric field generated by the display pixel electrodes 311 and the common electrode 290. However, due to regional differences in the thickness of the first alignment layer 320, the intensity of an electric field provided to the liquid crystal layer 400 may actually be weaker in the first and second dummy areas DA_1 and DA_2 than in the display area AA. This is because the intensity of an electric field becomes weaker, when the first alignment layer 320 is farther from the pixel electrodes 310 and the common electrode 290.

Therefore, as discussed above with reference to FIGS. 2 and 3, even when ionic impurities in the liquid crystal layer 400 accumulate in the f first and second dummy areas DA_1 and DA_2 over time, the degree to which the ionic impurities accumulate in the first and second dummy areas DA_1 and DA_2 may be lowered because the intensity of an electric field applied to the first and second dummy areas DA_1 and DA_2 is weak. Thus, the amount of ionic impurities accumulated in the first and second dummy areas DA_1 and DA_2 and parts of the display area AA adjacent to the first and second dummy areas DA_1 and DA_2 may be minimized, and as a result, regional differences in the brightness of the display area AA may be minimized.

As mentioned above, the first alignment layer 320 may be thicker over the display pixel PX11 than over the display pixel PX12. Accordingly, even when more ionic impurities accumulate in a part of the liquid crystal layer 400 overlapping the display pixel PX11 than in a part of the liquid crystal layer 400 overlapping the display pixel PX12, a difference in brightness between the display pixels PX11 and PX12 may be minimized because the intensity of an electric field applied to the part of the liquid crystal layer 400 overlapping the display pixel PX11 weaker than the intensity of an electric field applied to the part of the liquid crystal layer 400 overlapping the display pixel PX12.

The opposite substrate 500 will hereinafter be described.

The opposite substrate 500 includes a second base substrate 550. The second base substrate 550 may perform the same functions as the first base substrate 210 and may include the same material as that of the first base substrate 210. The second base substrate 550 may face the first base substrate 210. The area of the second base substrate 550 may be smaller than the area of the first base substrate 210, and thus, the second base substrate 550 may be overlapped by the first base substrate 210.

The light-shielding member 540 is disposed on the second base substrate 550, e.g., below the second base substrate 550, as illustrated in FIGS. 6 and 7. The light-shielding member 540 may overlap the transistors TR of the display pixels PX, the data lines D1 through Dm, the gate lines G1 through Gn, the first dummy pixels DPX1, and the second dummy pixels DPX2 and may thus prevent light leakage that may be caused by a misalignment of the liquid crystal molecules in the liquid crystal layer 400.

Color filters 530 are disposed on the light-shielding member 540, e.g., below the light-shielding member 550, as illustrated in FIGS. 6 and 7. The color filters 530 allow the transmission of light of a predetermined wavelength band among beams of light incident thereupon from outside the first base substrate 210 and block the transmission of the rest of the incident light, thereby making light emitted toward the outside of the second base substrate 550 show a predetermined color.

The light-shielding member 540 and the color filters 530 are not limited to be adjacent to the second base substrate 550, but may be adjacent to the first base substrate 210. In a case in which the light-shielding member 540 and the color filters 530 are adjacent to the first base substrate 210, the color filters 530 may replace the planarization layer 280, but the invention is not limited thereto. That is, the color filters 530 may be disposed between the passivation layer 270 and the planarization layer 280, and the planarization layer 280 may planarize any height differences provided by the color filters 530.

An overcoat layer 520 may be disposed on the light-shielding member 540 and the color filters 530, e.g., below the light-shielding member 540 and the color filters 530, as illustrated in FIGS. 6 and 7. The overcoat layer 520 may reduce any height differences provided by the light-shielding member 540 and the color filters 530, but the invention is not limited thereto. The overcoat layer 520 may not be provided.

A second alignment layer 510 may be disposed on the overcoat layer 520, e.g., below the overcoat layer 520, as illustrated in FIGS. 6 and 7. The second alignment layer 510, like the first alignment layer 320, may pretilt the liquid crystal molecules in the liquid crystal layer 400. That is, in a case in which an electric field is yet to be applied to the liquid crystal layer 400, the second alignment layer 510 may align the liquid crystal molecules in the liquid crystal layer 400 to be directed to a predetermined direction from a plane where the second alignment layer 510 is disposed and may align the liquid crystal molecules in the liquid crystal layer 400 to define an angle of about 0.5° to about 3° with reference to a direction perpendicular to the plane where the second alignment layer 510 is disposed.

The second alignment layer 510, unlike the first alignment layer 320, may generally have a uniform thickness throughout the display area AA, the first dummy area DA_1, and the second dummy area DA_2. In another exemplary embodiment, the second alignment layer 510 may not be provided.

The liquid crystal layer 400 will hereinafter be described.

The liquid crystal layer 400 is interposed between the array substrate 200 and the opposite substrate 500. The liquid crystal layer 400 may include a plurality of liquid crystal molecules having dielectric anisotropy. In an exemplary embodiment, the liquid crystal molecules may be horizontal alignment-type liquid crystal molecules aligned between the array substrate 200 and the opposite substrate 500 in a horizontal direction with respect to the array substrate 200 and the opposite substrate 500, for example. In response to an electric field being applied between the array substrate 200 and the opposite substrate 500, the liquid crystal molecules may rotate in a particular direction between the array substrate 200 and the opposite substrate 500, and may thus adjust the state of polarization of light transmitted therethrough.

The exemplary embodiment has been described, taking, as an example, a case in which the pixel electrodes 310 are disposed on the common electrode 290, but the invention is not limited thereto. That is, even in an LCD device in which the common electrode 290 is disposed on the pixel electrodes 310, regional differences in brightness may occur and may be minimized by adjusting the thickness of the first alignment layer 320.

Also, the exemplary embodiment has been described, taking, as an example, a case in which the common electrode 290 is not particularly patterned and the pixel electrodes 310 are patterned, but the invention is not limited thereto. That is, even in an LCD device in which the common electrode 290 and the pixel electrodes 310 are both patterned, i.e., an in-plane switching ("IPS") LCD device, regional differences in brightness may occur and may be minimized by adjusting the thickness of the first alignment layer 320.

Also, the exemplary embodiment has been described, taking a horizontal alignment-type LCD device using horizontal alignment-type liquid crystal molecules as an example, but the invention is not limited thereto. That is, even in a vertical alignment-type LCD device in which the liquid crystal layer 400 is disposed between the common electrode 290 and the pixel electrodes 310 and the liquid crystal molecules in the liquid crystal layer 400 are vertical alignment-type liquid crystal molecules aligned between the array substrate 200 and the opposite substrate 500 in a vertical direction with respect to the array substrate 200 and the opposite substrate 500, regional differences in brightness may occur and may be minimized by adjusting the thickness of the first alignment layer 320.

The formation of the first alignment layer 320 will hereinafter be described with reference to FIGS. 8 through 12.

Figure 8:
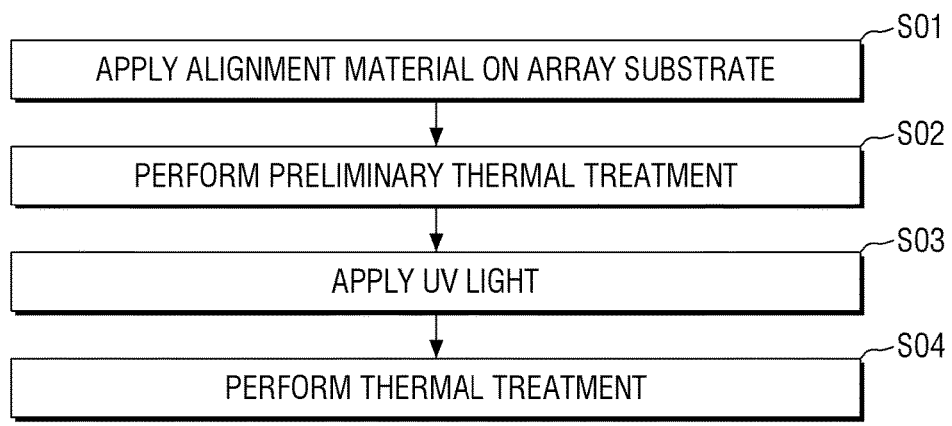
FIG. 8 is a flowchart illustrating a method of an exemplary embodiment of forming a first alignment layer according to the invention.
Figure 9:
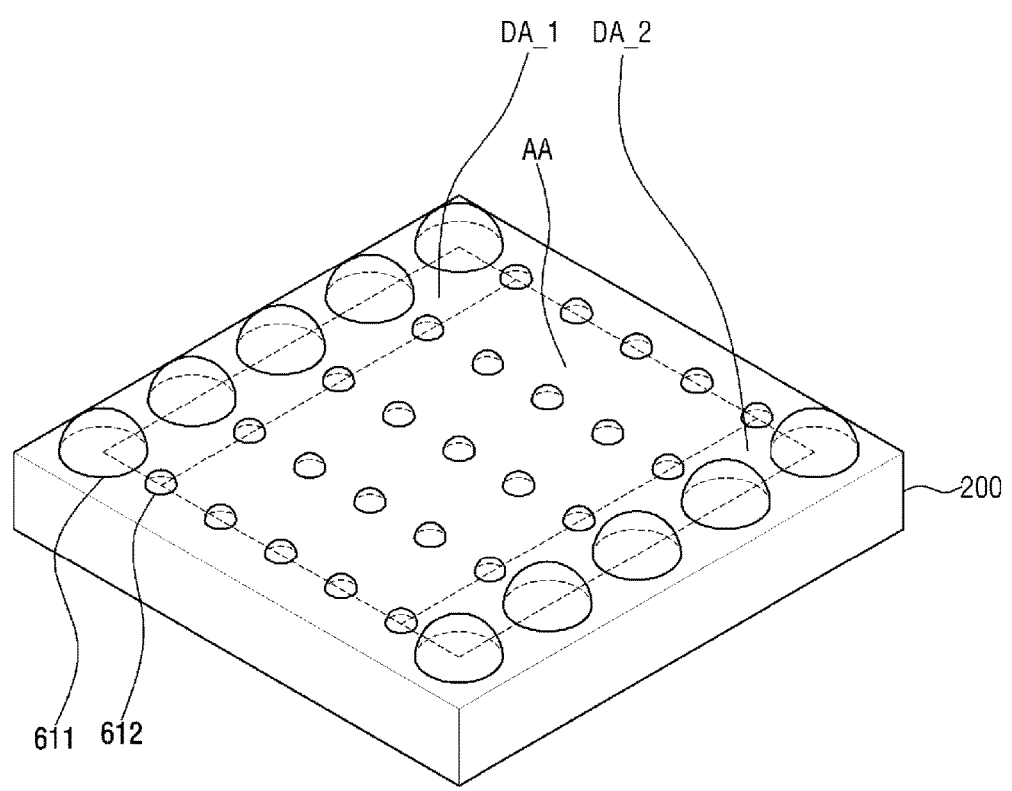
FIG. 9 is a perspective view of an LCD device for explaining the application of an alignment material on an array substrate, as performed in the method of FIG. 8.
Figure 10:
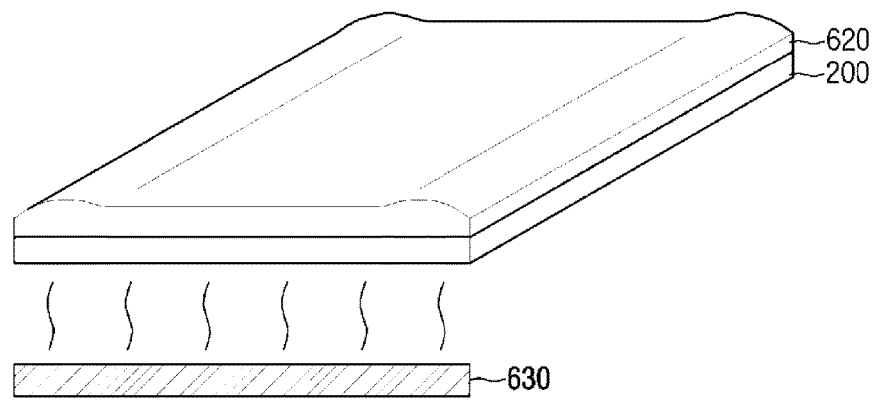
FIG. 10 is a perspective view of an LCD device for explaining the performing of preliminary thermal treatment, as performed in the method of FIG. 8.
Figure 11:
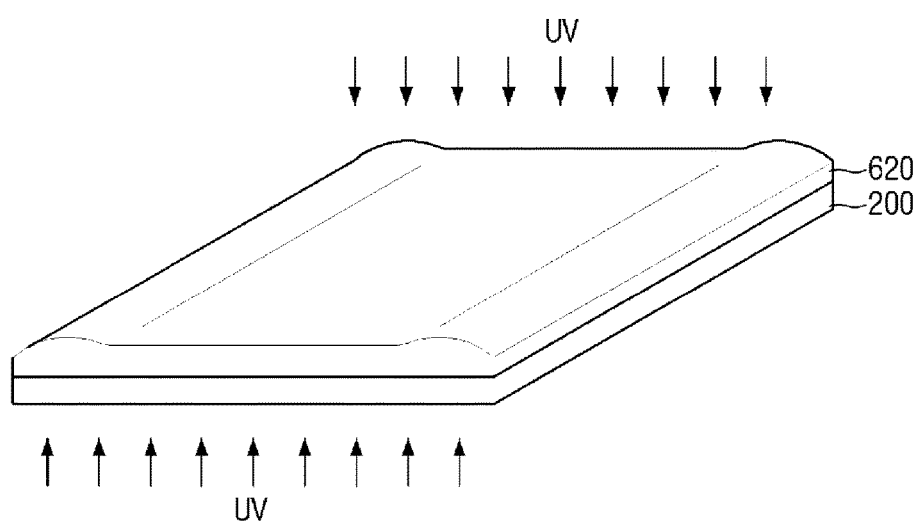
FIG. 11 is a perspective view of an LCD device for explaining the application of ultraviolet ("UV") light, as performed in the method of FIG. 8.
Figure 12:
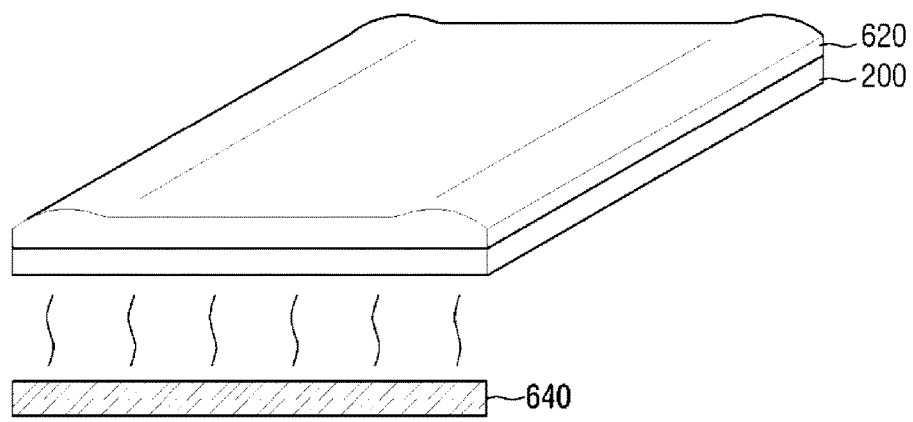
FIG. 12 is a perspective view of an LCD device for explaining the performing of thermal treatment, as performed in the method of FIG. 8.

FIG. 8 is a flowchart illustrating a method of forming a first alignment layer according to an exemplary embodiment of the invention, FIG. 9 is a perspective view of an LCD device for explaining the application of an alignment material on an array substrate, as performed in the method of FIG. 8, FIG. 10 is a perspective view of an LCD device for explaining the performing of preliminary thermal treatment, as performed in the method of FIG. 8, FIG. 11 is a perspective view of an LCD device for explaining the application of ultraviolet ("UV") light, as performed in the method of FIG. 8, and FIG. 12 is a perspective view of an LCD device for explaining the performing of thermal treatment, as performed in the method of FIG. 8.

Referring to FIG. 8, a method of forming the first alignment layer 320 according to the exemplary embodiment includes applying an alignment material (for example, a polymer material or a photo-alignment material) on the array substrate 200 (S01), performing preliminary thermal treatment on the alignment material at low temperature (S02), applying UV light to the alignment material (S03), and performing thermal treatment on the alignment material at high temperature (S04). The array substrate 200 of FIGS. 9 through 12 may be an array substrate 200 in which the first alignment layer 320, among other elements of the array substrate 200 of FIGS. 6 and 7, is yet to be provided. Each of operations S01 through S04 of the method of FIG. 8 will hereinafter be described in detail.

Referring to FIG. 9, in an exemplary embodiment, a cyclobutane-based photo decomposition-type material, an azobenzene-based photo-isomerization material, or an alignment material comprising the photo-isomerization material or the photo-polymerization-type material is applied on the array substrate 200, for example. In an exemplary embodiment, the alignment material may comprise a photo-isomerization-type material or a photo-polymerization-type material and a solvent, for example.

The solvent may be an organic solvent. In an exemplary embodiment, cyclopentanol, a halogen-based solvent such as 1-chlorobutane, chlorobenzene, 1,1-dichloroethane, 1,2-dichloroethane, chloroform, or 1,1,2,2-tetrachloroethane, an ether-based solvent such as diethyl ether, tetrahydrofuran, or 1,4-dioxane, a ketone-based solvent such as methyl ethyl ketone ("MEK"), acetone, or cyclohexanone, an acetate-based solvent such as propylene glycol monomethyl ether acetate ("PGMEA"), an ester-based solvent such as ethyl acetate, an acetate-based solvent such as γ-butyrolactone, a carbonate-based solvent such as ethylene carbonate or propylene carbonate, an amine-based solvent such as triethylamine or pyridine, a nitrile-based solvent such as acetonitrile, an amide-based solvent such as N, N'-dimethylformamide ("DMF"), N, N'-dimethylacetamide ("DMAc"), tetramethylurea, or N-methylpyrrolidone ("NMP"), a nitro-based solvent such as nitromethane or nitrobenzene, a sulfide-based solvent such as dimethyl sulfoxide ("DMSO") or sulfolane, a phosphoric acid-based solvent such as hexamethyl phosphoric amide or tri-n-butyl phosphate, or any combinations thereof may be used as the organic solvent.

In an exemplary embodiment, the alignment material may be applied on the array substrate 200 using an inkjet method, for example. The inkjet method is a method by which the alignment material is applied on the array substrate 200 by ejecting the alignment material in units of a predetermined amount onto the array substrate 200 through inkjet nozzles so as for droplets of the ejected alignment material to spread over the array substrate 200 in all directions.

To form a difference in the thickness of the first alignment layer 320 between the display area AA and the first and second dummy areas DA_1 and DA_2, the amount 611 of an alignment material 611 ejected onto the first or second dummy area DA_1 and DA_2 may be larger than an alignment material 612 ejected onto the display area AA. Even when droplets of the ejected alignment material spread all over the array substrate 200, the thickness of the alignment material 611 ejected onto the first or second dummy area DA_1 or DA_2 may be larger than the thickness of the alignment material 612 ejected onto the display area AA because the alignment material has viscosity.

However, the invention is not limited to this. That is, even when the amount by which the alignment material is ejected through a single inkjet nozzle is the same for both the display area AA and the first and second dummy areas DA_1 and DA_2, a difference in the thickness of the alignment material may be provided between the display area AA and the first and second dummy areas DA_1 and DA_2 by ejecting the alignment material onto the first and second dummy areas DA_1 and DA_2 at intervals of a relatively short period of time and onto the display area AA at intervals of a relatively long period of time.

In an exemplary embodiment, in order for the alignment material to have appropriate viscosity, the content of the photo-isomerization material or the photo-polymerization material in the alignment material may be about 5.0 wt % to about 7.0 wt %, and more specifically, about 6.0 wt %, for example.

Thereafter, referring to FIG. 10, the alignment material is subjected to a preliminary thermal treatment process using a first heat source 630. As a result, the solvent may be eliminated from the alignment material, and a polymer layer 620 may be provided. In an exemplary embodiment, the preliminary thermal treatment process may be performed at a temperature of about 70° C. to about 80° C. for about 60 seconds to about 80 seconds, but the invention is not limited thereto.

Thereafter, referring to FIG. 11, the first alignment layer 320 (refer to FIG. 6) may be provided by applying polarized UV light to one or both surfaces of the polymer layer 620 on the array substrate 200. In an exemplary embodiment, UV light having a wavelength of about 240 nanometers to about 380 nanometers may be used as the polarized UV light, for example. In the exemplary embodiment, UV light having a wavelength of about 254 nanometers may be used as the polarized UV light.

However, the invention is not limited to forming the alignment layer 320 through the application of UV light. That is, the first alignment layer 320 may be provided by rubbing the polymer layer 620 on the array substrate 200 with a material having sufficient roughness to define grooves on the polymer layer 620.

Thereafter, referring to FIG. 12, the orientation of the first alignment layer 320 may be improved by performing another thermal treatment process on the first alignment layer 320 using a second heat source 640 so as to reorient the entire polymer of the first alignment layer 320. In an exemplary embodiment, the second heat source 640 may have a higher temperature than the first heat source 630, for example, a temperature of about 300° C., for example.

Figure 13:
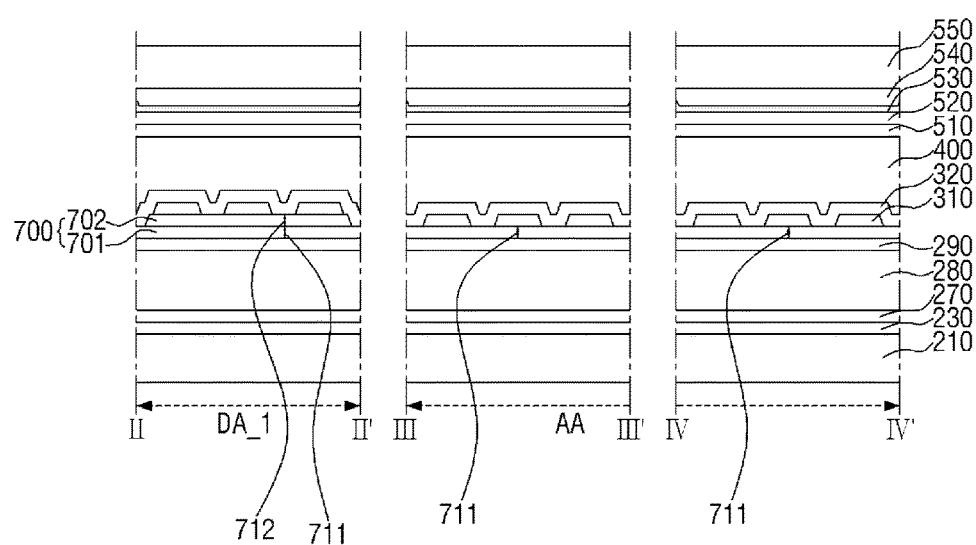
FIG. 13 is a cross-sectional view of an LCD device according to another exemplary embodiment of the invention, taken along lines and IV-IV' of FIG. 5.

FIG. 13 is a cross-sectional view of an LCD device according to another exemplary embodiment of the invention, taken along lines and IV-IV' of FIG. 5.

In the previous exemplary embodiments and exemplary embodiments shown in FIG. 13, like reference numerals indicate like elements, and thus, descriptions thereof will be omitted or simplified.

Referring to FIG. 13, an LCD device according to the exemplary embodiment differs from the LCD device of FIG. 7 in the structure of a pixel insulating layer 700.

The pixel insulating layer 300 of the LCD device of FIG. 7 has a uniform thickness through the display area AA and the first and second dummy areas DA_1 (refer to FIG. 2) and DA_2 (refer to FIG. 2), but the pixel insulating layer 700 of the LCD device according to the exemplary embodiment of FIG. 13 has different thicknesses in parts of the display area AA and the first and second dummy areas DA_1 and DA_2. The average thickness of the pixel insulating layer 700 may be larger in the first and second dummy areas DA_1 and DA_2 than in the display area AA.

The pixel insulating layer 700 of the LCD device according to the exemplary embodiment includes a first sub-pixel insulating layer 701 and a second sub-pixel insulating layer 702. The first sub-pixel insulating layer 701 may be provided in all the first dummy area DA_1, the second dummy area DA_2, and the display area AA, but the second sub-pixel insulating layer 702 may be provided only in the first and second dummy areas DA_1 and DA_2. The first sub-pixel insulating layer 701 may have a thickness corresponding to a tenth length 711, and the second sub-pixel insulating layer 702 may have a thickness corresponding to an eleventh length 712. The tenth length 711 may be the same as the eleventh length 712 or may be different from the eleventh length 712.

More specifically, referring to FIG. 13, which illustrates the cross sections of a first dummy pixel DPX1_11 (refer to FIG. 3) in a first row and a first column of an array of a plurality of first dummy pixels DPX (refer to FIG. 2), a display pixel PX11 (refer to FIG. 3) in a first row and a first column of an array of a plurality of display pixels PX (refer to FIG. 2), and a display pixel PX12 (refer to FIG. 3) in the first display pixel row and a second display pixel column of the array of the display pixels PX, the first and second sub-pixel insulating layers 701 and 702 may both be disposed in the first dummy pixel DPX1_11, and only the first sub-pixel insulating layer 701 may be disposed in the display pixels PX11 and PX12.

That is, in the first and second dummy areas DA_1 and DA_2, the first sub-pixel insulating layer 701 is disposed on a common electrode 290, the second sub-pixel insulating layer 702 is disposed on the first sub-pixel insulating layer 701, and pixel electrodes 310 are disposed on the second sub-pixel insulating layer 702. In the display area AA, the first sub-pixel insulating layer 701 is disposed on the common electrode 290, and pixel electrodes 310 are disposed on the first sub-pixel insulating layer 701.

Accordingly, the common electrode 290 and the pixel electrodes 310 are spaced by as much as the sum of the tenth length 711, which corresponds to the thickness of the first sub-pixel insulating layer 701, and the eleventh length 712, which corresponds to the thickness of the second sub-pixel insulating layer 702, in the first and second dummy areas DA_1 and DA_2, but by as much as the tenth length 711, which corresponds to the thickness of the first sub-pixel insulating layer 701, in the display area AA.

The voltage provided to the pixel electrodes 310 in the first and second dummy areas DA_1 and DA_2 may be the same as the voltage provided to the pixel electrodes 310 in the display area AA, and the voltage provided to the common electrode 290 in the first and second dummy areas DA_1 and DA_2 may be the same as the voltage provided to the common electrode 290 in the display area AA. Since the distance by which the pixel electrodes 310 and the common electrode 290 are spaced in the first and second dummy areas DA_1 and DA_2 is the tenth length 712 larger than the distance by which the pixel electrodes 310 and the common electrode 290 are spaced in the display area AA, the intensity of an electric field generated by the pixel electrodes 310 and the common electrode 290 in the first and second dummy areas DA_1 and DA_2 may be weaker than the intensity of an electric field generated by the pixel electrodes 310 and the common electrode 290 in the display area AA. Accordingly, an electric field generated in the liquid crystal layer 400 may be weaker in the first and second dummy areas DA_1 and DA_2 than in the display area AA.

Due to regional differences in the thickness of the pixel insulating layer 700, a weaker electric field may be generated in the parts of the liquid crystal layer 400 in the first and second dummy areas DA_1 and DA_2 than in a part of the liquid crystal layer 400 in the display area AA.

Thus, as mentioned above with regard to the previous exemplary embodiment, the amount of ionic impurities accumulated in the first and second dummy areas DA_1 and DA_2 and parts of the display area AA adjacent to the first and second dummy areas DA_1 and DA_2 may be minimized, and as a result, regional differences in the brightness of the display area AA may be minimized.

In an exemplary embodiment, the first and second sub-pixel insulating layers 701 and 702 may include an inorganic insulating material such as silicon oxide (SiOx) or silicon nitride (SiNx), for example.

In an alternative exemplary embodiment to the exemplary embodiment, a first alignment layer 320 may have a varying thickness from one area to another area, as illustrated in FIG. 5, and the pixel insulating layer 700 may include the first and second sub-pixel insulating layers 701 and 702. In this alternative exemplary embodiment, regional differences in the brightness of the display area AA may be further minimized.

The formation of the second sub-pixel insulating layer 702 will hereinafter be described with reference to FIGS. 14 through 18.

Figure 14:
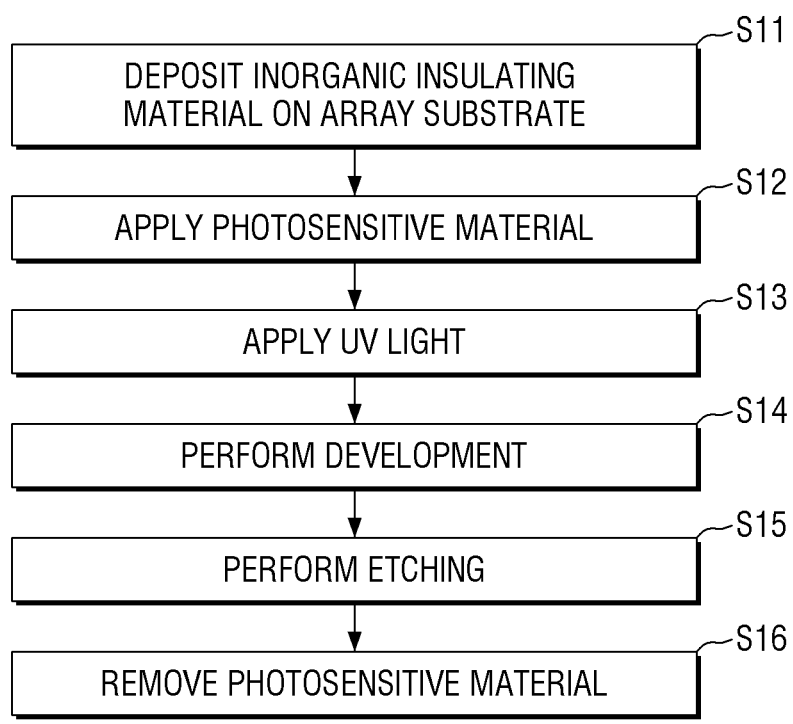
FIG. 14 is a flowchart illustrating a method of an exemplary embodiment of forming a second sub-pixel insulating layer according to the invention.
Figure 15:
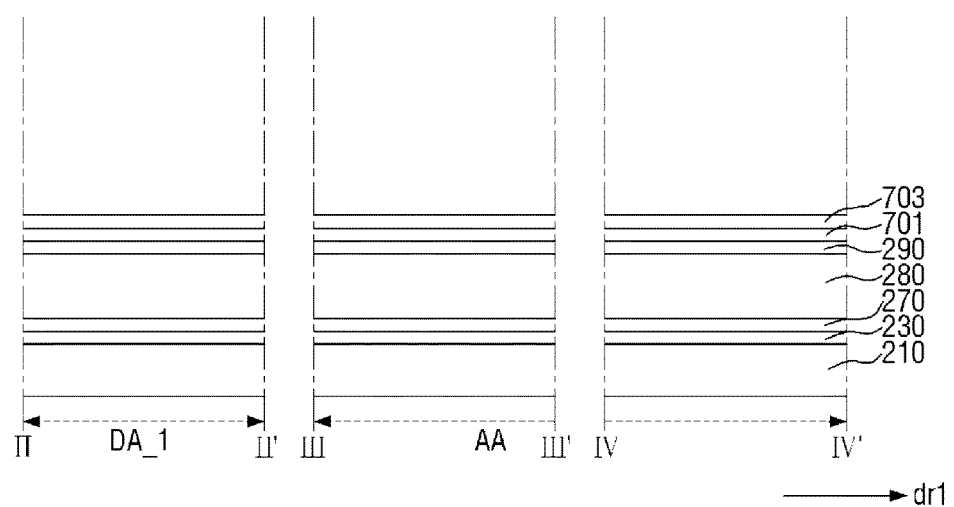
FIG. 15 is a cross-sectional view of an LCD device for explaining the deposition of an inorganic insulating material on an array substrate, as performed in the method of FIG. 14.
Figure 16:
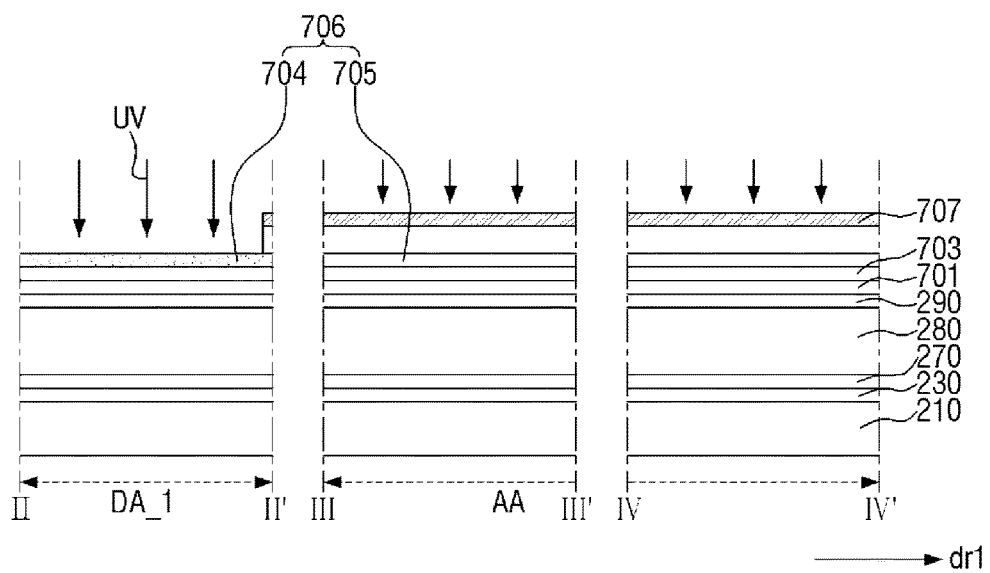
FIG. 16 is a cross-sectional view of an LCD device for explaining the performing of exposure, as performed in the method of FIG. 14.
Figure 17:
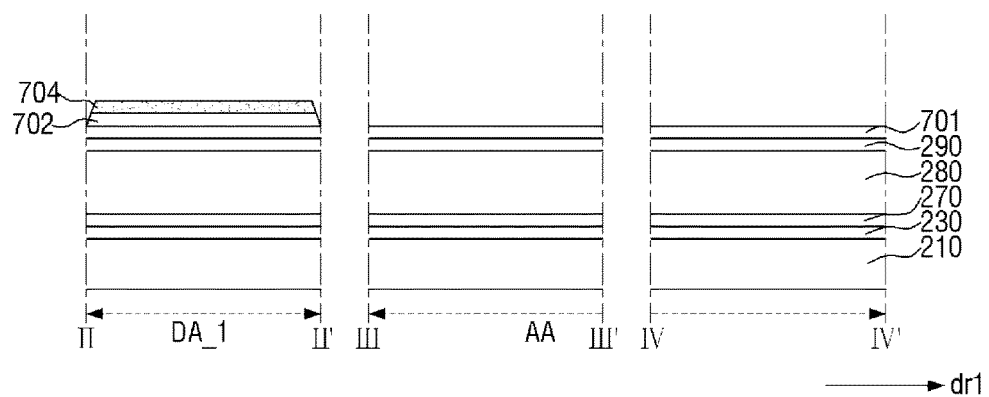
FIG. 17 is a cross-sectional view of an LCD device obtained from an etching process as performed in the method of FIG. 14.
Figure 18:
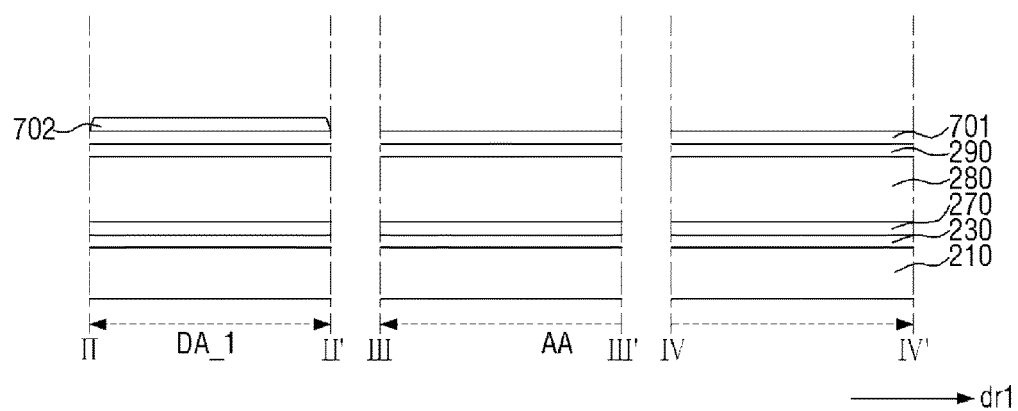
FIG. 18 is a cross-sectional view of an LCD device obtained from the formation of a second sub-pixel insulating layer, as performed in the method of FIG. 14.

FIG. 14 is a flowchart illustrating a method of forming a second sub-pixel insulating layer according to an exemplary embodiment of the invention, FIG. 15 is a cross-sectional view of an LCD device for explaining the deposition of an inorganic insulating material on an array substrate, as performed in the method of FIG. 14, FIG. 16 is a cross-sectional view of an LCD device for explaining the performing of exposure, as performed in the method of FIG. 14, FIG. 17 is a cross-sectional view of an LCD device obtained from an etching process as performed in the method of FIG. 14, and FIG. 18 is a cross-sectional view of an LCD device obtained from the formation of a second sub-pixel insulating layer, as performed in the method of FIG. 14.

Referring to FIG. 14, a method of forming the second sub-pixel insulating layer 702 according to the exemplary embodiment includes applying an inorganic insulating material on the array substrate 200 (S11), applying a photosensitive material on the inorganic insulating material (S12), applying UV light to a part of the photosensitive material using a mask 707 (S13), performing a development process so as to remove a part of the photosensitive material (S14), etching and thus removing an exposed part of the inorganic insulating material (S15), and removing the rest of the photosensitive material (S16). The array substrate 200 of FIGS. 14 through 18 may be an array substrate 200 on which the first sub-pixel insulating layer 701 is disposed, and the first sub-pixel insulating layer 701 may be provided in the same shape and the same manner as the pixel insulating layer 300 in the previous exemplary embodiment of FIGS. 6 and 7. Each of operations S11 through S16 of the method of FIG. 14 will hereinafter be described in detail.

Referring to FIG. 15, an inorganic insulating layer 703 is provided by depositing an inorganic insulating material such as silicon oxide (SiOx) or silicon nitride (SiNx) on the array substrate 200 (refer to FIG. 6) on which the first sub-pixel electrode 701 is disposed.

Thereafter, referring to FIG. 16, a photosensitive material layer 706 is disposed on the inorganic insulating layer 703 using a photosensitive material. The photosensitive material layer 706 may include a first area 704 and a second area 705 and may be cured upon being irradiated with UV light. A cured part of the photosensitive material layer 706 may remain unremoved after a development process and may thus protect the inorganic insulating material provided therebelow.

The first area 704 may be an area of a part of the photosensitive material layer 706 that to be irradiated with UV light, and the second area 705 may be an area of a part of the photosensitive material layer 706 that is not to be irradiated with UV light.

After the formation of the photosensitive material layer 706, UV light is applied to an area in which to form the second sub-pixel insulating layer 702. The area in which to form the second sub-pixel insulating layer 702 may correspond to the first area 704. The mask 707 may overlap the entire array substrate 200 except for the area in which to form the second sub-pixel insulating layer 702, and the second area 705 may correspond to the entire array substrate 200 except for the area in which to form the second sub-pixel insulating layer 702. Due to this shape of the mask 707, UV light may be applied only to the first area 704.

In the exemplary embodiment, a part of the photosensitive material layer 706 that is irradiated with UV light remains, but the invention is not limited thereto. That is, in another exemplary embodiment, a part of the photosensitive material layer 706 that is not irradiated with UV light may be removed, in which case, the mask 707 may overlap an area in which the second sub-pixel insulating layer 702 is not to be provided.

Thereafter, referring to FIG. 17, a development process may be performed to remove a part of the photosensitive material layer 706 in the second area 705. Thereafter, an etching process may be performed to remove a part of the inorganic insulating layer 703 overlapping the second area 705.

The second sub-pixel insulating layer 702 is disposed on the first sub-pixel insulating layer 701, and the first and second sub-pixel insulating layers 701 and 702 may include inorganic insulating materials having similar chemical properties. Accordingly, during the removal of the part of the inorganic insulating layer 703 overlapping the second area 705, the first sub-pixel insulating layer 701 may be partially removed. To minimize such damage to the first sub-pixel insulating layer 701, the first and second sub-pixel insulating layers 701 and 702 may include inorganic insulating materials having different etch selectivities.

Thereafter, referring to FIG. 18, by removing the photosensitive material layer 706 from the first area 704, the second sub-pixel insulating layer 702 may be provided in a desired shape on the first sub-pixel insulating layer 701.

Figure 19:
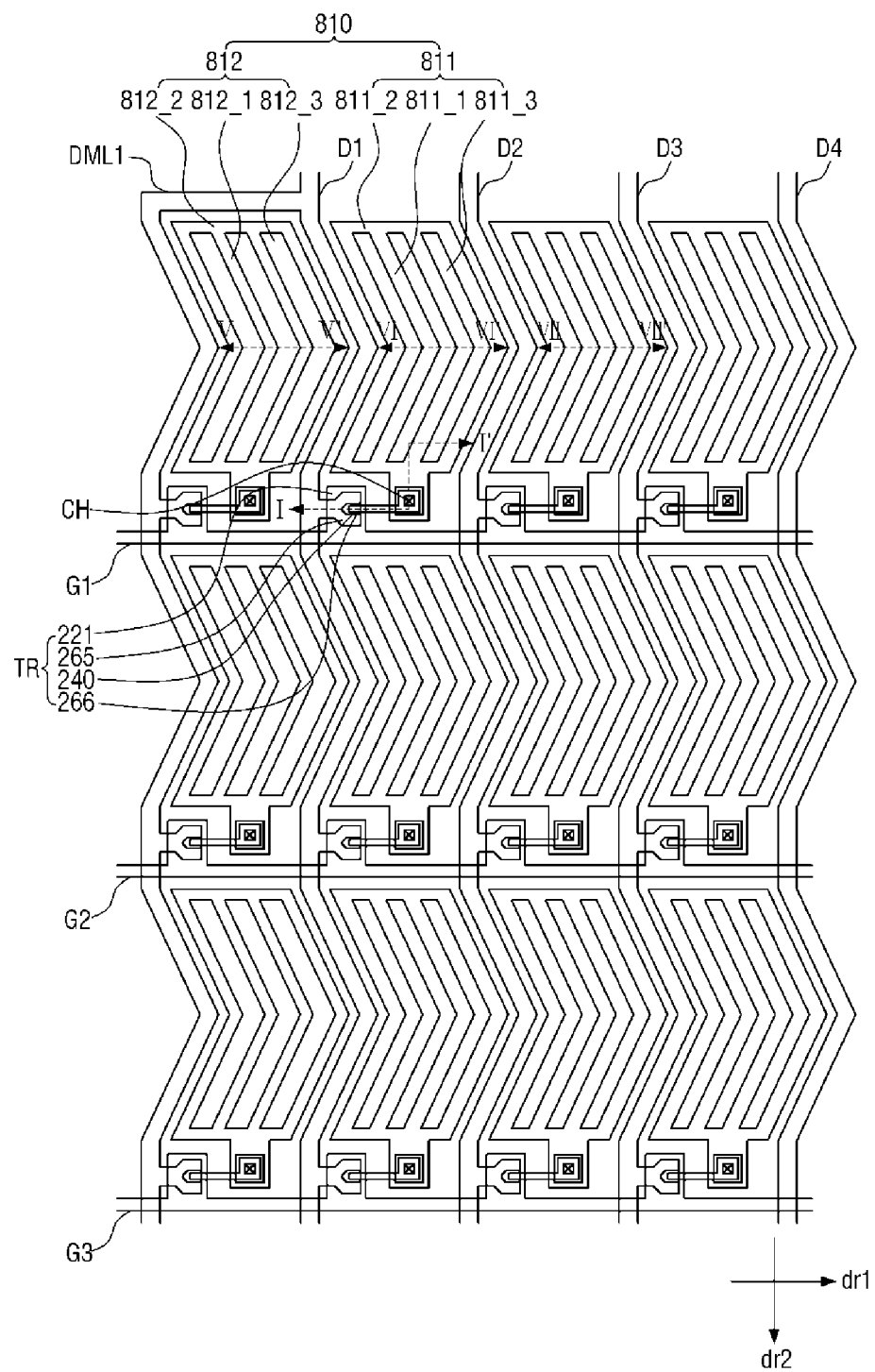
FIG. 19 is a plan view of another exemplary embodiment of pixels, in the area A of FIG. 2, of an LCD device according to the invention.
Figure 20:
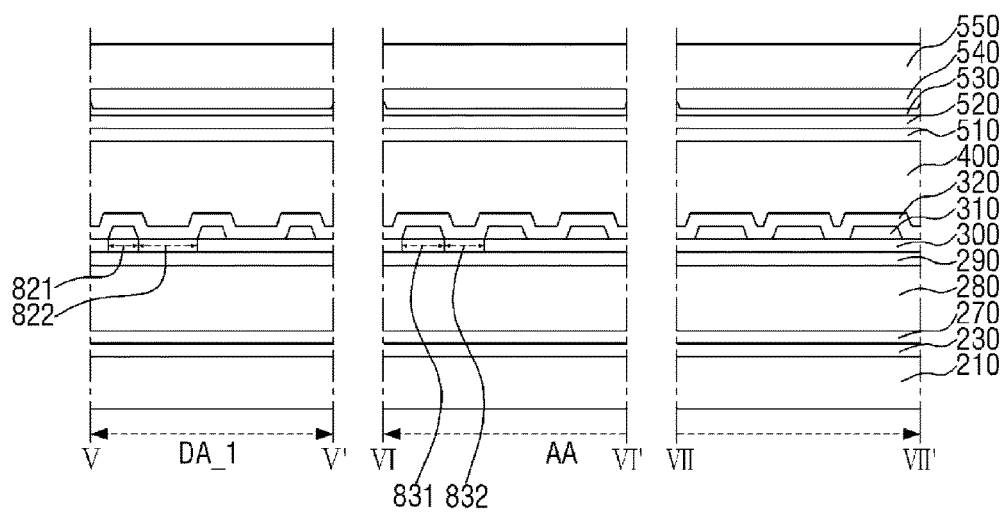
FIG. 20 is a cross-sectional view taken along lines V-V', VI-VI', and VII-VII' of FIG. 19

FIG. 19 is a plan view of pixels, in the area A of FIG. 2, of an LCD device according to another exemplary embodiment of the invention, and FIG. 20 is a cross-sectional view taken along lines V-V', VI-VI', and VII-VII' of FIG. 19.

In the exemplary embodiment shown in FIG. 19 and previous exemplary embodiments, like reference numerals indicate like elements, and thus, descriptions thereof will be omitted or simplified.

Referring to FIGS. 19 and 20, an LCD device according to the exemplary embodiment differs from the LCD device of FIG. 5 in the structure of pixel electrodes 810.

More specifically, in the LCD device of FIG. 5, the display pixel electrodes 311, the first dummy pixel electrodes 312, and the second dummy pixel electrodes (not shown) are all in the same shape, but in the LCD device according to the exemplary embodiment, display pixel electrodes 811, first dummy pixel electrodes 812, and second dummy pixel electrodes (not shown) have a different shape from one another.

More specifically, a widthwise length of first dummy branch electrodes 812_1 of a first dummy pixel electrode 812 in a first dummy pixel DPX1_11 (refer to FIG. 3) in a first row and a first column of an array of a plurality of first dummy pixels DPX (refer to FIG. 2) may be the same as a first width 821, and a widthwise length of first dummy slits 812_3 of the first dummy pixel electrode 812 in the first dummy pixel DPX1_11 may be the same as a second width 822. A widthwise length of display branch electrodes 811_1 of a display pixel electrode 811 in a display pixel PX11 (refer to FIG. 3) in a first row and a first column of an array of a plurality of display pixels PX may have a third width 831, and a widthwise length of display slits 811_3 of the display pixel electrode 811 in the display pixel PX11 may be the same as a fourth width 832. The term "widthwise length", as used herein, may indicate the width, in a first direction dr1, of the first dummy branch electrodes 812_1, the display branch electrodes 811_1, the first dummy slits 812_3, or the display slits 811_3.

The first width 821 may be larger than the third width 831, and the second width 822 may be larger than the fourth width 832. However, even in this case, the width, in the first direction dr1, of the display pixel electrode 811 in the first dummy pixel DPX1_11 may be the same as the width, in the first direction dr1, of the display pixel electrode 811 in the display pixel PX11 or in a display pixel PX12 in the first row and a second column of the array of the display pixels PX.

The intensity of an electric field generated in a liquid crystal layer 400 may be weaker in an area of the first dummy pixel DPX1_11 than in an area of the display pixel PX11.

More specifically, the voltage applied to the first dummy pixel electrode 812 in the first dummy pixel DPX1_11 may be the same as the voltage applied to the display pixel electrode 811 in the display pixel PX11, and the voltage applied to the common electrode 290 in the area of the first dummy pixel DPX1_11 may be the same as the voltage applied to the common electrode 290 in the area of the display pixel PX11. Thus, the intensity of an electric field generated by the first dummy pixel electrode 812 of the first dummy pixel DPX1_11 may be the same as the intensity of an electric field generated by the display pixel electrode 812 of the display pixel PX11. However, since the width, in the first direction dr1, of the first dummy slits 812_3 of the first dummy pixel electrode 812 of the first dummy pixel DPX1_11 is larger than the width, in the first direction dr1, of the display slits 811_3 of the display pixel electrode 811 of the display pixel PX11, the distance by which the center of each of the first dummy slits 812_3 of the first dummy pixel DPX1_11 is spaced from a corresponding neighboring first dummy branch electrode 812_1 of the first dummy pixel DPX1_11 may be larger than the distance by which the center of each of the display slits 811_3 of the display pixel PX11 is spaced from a corresponding neighboring display branch electrode 811_1 of the display pixel PX11. Accordingly, the intensity of an electric field generated in a part of the liquid crystal layer 400 overlapping the center of each of the first dummy slits 812_3 of the first dummy pixel DPX1_11 may be weaker than the intensity of an electric field generated in a part of the liquid crystal layer 400 overlapping the center of each of the display slits 811_3 of the display pixel PX11. Thus, a weaker electric field may be generated in a part of the liquid crystal layer 400 in the area of the first dummy pixel DPX1_11 than in a part of the liquid crystal layer 400 in the area of the display pixel PX11.

Therefore, as mentioned above with regard to the previous exemplary embodiment, the amount of ionic impurities accumulated in the first and second dummy areas DA_1 and DA_2 (refer to FIG. 2) and parts of the display area AA adjacent to the first and second dummy areas DA_1 and DA_2 may be minimized, and as a result, regional differences in the brightness of the display area AA may be minimized.

The aforementioned structure of the pixel electrodes 810 may be provided by changing the pattern of the mask 707, which is used to form the pixel electrodes 810 through patterning.

In an alternative exemplary embodiment to the exemplary embodiment, a first alignment layer 320 may have a varying thickness from one area to another area, as illustrated in FIG. 5, a pixel insulating layer 700 may include first and second sub-pixel insulating layers 701 and 702, and the structure of the pixel electrodes 810 may be varied from one area to another. In this alternative exemplary embodiment, regional differences in the brightness of the display area AA may be further minimized.

The exemplary embodiments of the invention have been described with reference to the accompanying drawings. However, those skilled in the art will appreciate that many variations and modifications may be made to the disclosed embodiments without substantially departing from the principles of the invention. Therefore, the disclosed embodiments of the invention are used in a generic and descriptive sense only and not for purposes of limitation.

What is claimed is:

1. A liquid crystal display device, comprising:
a substrate including a display area, in which a plurality of display pixels is arranged in a row direction and a column direction, a first dummy area, which is adjacent to a first side, in the row direction, of the display area, and a second dummy area, which is adjacent to a second side, in the row direction, of the display area;
pixel electrodes disposed on the substrate, the pixel electrodes including a plurality of display pixel electrodes, which are respectively disposed in the plurality of display pixels, a plurality of first dummy pixel electrodes, which are disposed in the first dummy area in the column direction, and a plurality of second dummy pixel electrodes, which are disposed in the second dummy area in the column direction; and an alignment layer disposed on the pixel electrodes, wherein a thickness of the alignment layer overlapping the first dummy pixel electrode and the second dummy pixel electrode is larger than a thickness of the alignment layer overlapping the pixel electrode.

2. The liquid crystal display device of claim 1, further comprising:

a plurality of data lines disposed on the substrate to extend in the column direction and connected to a plurality of rows of the plurality of display pixel electrodes;

a first dummy data line disposed on the substrate to extend in the column direction and connected to a plurality of rows of the plurality of first dummy pixel electrodes; and a second dummy data line disposed on the substrate to extend in the column direction and connected to a plurality of rows of the plurality of second dummy pixel electrodes.

3. The liquid crystal display device of claim 2, wherein:

the first dummy data line is connected to a data line disposed on a first outermost side of the display area; and the second dummy data line is connected to a data line disposed on a second outermost side of the display area.

4. The liquid crystal display device of claim 1, wherein a number of the plurality of rows of the plurality of first dummy pixel electrodes and a number of the plurality of rows of the plurality of second dummy pixel electrodes are the same as a number of the plurality of rows of the plurality of display pixel electrodes.

5. The liquid crystal display device of claim 1, wherein:

each of the plurality of first dummy pixel electrodes includes first through third branch electrodes, which extend at an angle of about 45° or less with respect to the column direction, are disposed in series in the row direction, and are parallel to one another;

a distance from the first branch electrode to the display area is larger than a distance from the second branch electrode to the display area;

the distance from the second branch electrode to the display area is larger than a distance from the third branch electrode to the display area;

a distance from a top surface of the first branch electrode to a top surface of a part of the alignment layer overlapping the first branch electrode is larger than a distance from a top surface of the second branch electrode to a top surface of a part of the alignment layer overlapping the second branch electrode; and the distance from the top surface of the second branch electrode to the top surface of the part of the alignment layer overlapping the first branch electrode is larger than a distance from a top surface of the third branch electrode to a top surface of a part of the alignment layer overlapping the third branch electrode.

6. The liquid crystal display device of claim 1, wherein an average thickness of a part of the alignment layer overlapping a column of the plurality of display pixels adjacent to the first dummy area or the second dummy area is larger than an average thickness of a part of the alignment layer overlapping a column of the plurality of display pixels not adjacent to the first dummy area or the second dummy area.

7. The liquid crystal display device of claim 1, wherein: voltages of the same polarity are provided to the plurality of first dummy pixel electrodes; and voltages of the same polarity are provided to the plurality of second dummy pixel electrodes.

8. The liquid crystal display device of claim 1, wherein:

the average thickness of the alignment layer in the first and second dummy areas is 710 angstroms to 730 angstroms; and the average thickness of the alignment layer in the display area is 590 angstroms to 610 angstroms.

9. The liquid crystal display device of claim 1, wherein the alignment layer has a minimum thickness in an area overlapping a column of the plurality of display pixels in the middle of the display area.

10. The liquid crystal display device of claim 1, further comprising:

a liquid crystal layer disposed on the alignment layer, wherein an average intensity of an electric field generated in the liquid crystal layer is weaker in the first and second dummy areas than in the display area.

11. The liquid crystal display device of claim 1, further comprising:

a light-shielding member disposed on the alignment layer, wherein the light-shielding member overlaps the first and second dummy areas.

12. A liquid crystal display device, comprising:

a substrate including a display area, in which a plurality of display pixels is arranged in a row direction and a column direction, a first dummy area, which is adjacent to a first side, in the row direction, of the display area, and a second dummy area, which is adjacent to a second side, in the row direction, of the display area; and pixel electrodes disposed on the substrate, the pixel electrodes including a plurality of display pixel electrodes, which are respectively disposed in the plurality of display pixels, a plurality of first dummy pixel electrodes, which are disposed in the first dummy area in the column direction, and a plurality of second dummy pixel electrodes, which are disposed in the second dummy area in the column direction, wherein each of the plurality of display pixel electrodes, the plurality of first dummy pixel electrodes, and the plurality of second dummy pixel electrodes includes a plurality of branch electrodes, which extend in the column direction, and a widthwise length, in the row direction, of the branch electrodes is smaller in the plurality of first and second dummy pixel electrodes than in the plurality of display pixel electrodes.

13. The liquid crystal display device of claim 12, wherein:

a plurality of slits, which extend in the column direction, is defined in each of the plurality of display pixel electrodes, the plurality of first dummy pixel electrodes, and the plurality of second dummy pixel electrodes; and a widthwise direction, in the row direction, of the slits is larger in the plurality of first and second dummy pixel electrodes than in the plurality of display pixel electrodes.

14. The liquid crystal display device of claim 12, further comprising:

a plurality of data lines disposed on the substrate to extend in the column direction and connected to a plurality of rows of the plurality of display pixel electrodes;

a first dummy data line disposed on the substrate to extend in the column direction and connected to a plurality of rows of the plurality of first dummy pixel electrodes; and a second dummy data line disposed on the substrate to extend in the column direction and connected to a plurality of rows of the plurality of second dummy pixel electrodes, wherein:

the first dummy data line is connected to a data line disposed on a first outermost side of the display area; and the second dummy data line is connected to a data line disposed on a second outermost side of the display area.

15. A method of manufacturing a liquid crystal display device, comprising:

preparing a substrate including a display area, in which a plurality of display pixels is arranged in a row direction and a column direction, a first dummy area, which is adjacent to a first side, in the row direction, of the display area, and a second dummy area, which is adjacent to a second side, in the row direction, of the display area;

forming pixel electrodes on the substrate in the display area;

forming dummy pixel electrodes on the substrate in the first dummy area; and forming an alignment layer on the pixel electrode and the dummy pixel electrodes such that a thickness of the alignment layer overlapping the dummy pixel electrode is larger than a thickness of the alignment layer overlapping the pixel electrode.

16. The method of claim 15, wherein:

the forming the alignment layer, comprises applying an alignment material on the pixel electrodes and the dummy pixel electrodes, drying the alignment material, applying ultraviolet light to the alignment material, and performing thermal treatment on the alignment material; and the applying the alignment material, comprises applying a larger amount of the alignment material on the first and second dummy areas than on the display area.

* * * * *